United States Patent [19]
MacDonald

[11] Patent Number: 6,039,320
[45] Date of Patent: Mar. 21, 2000

[54] ADJUSTABLE SEAL FOR PROPELLER DRIVE SHAFT

[75] Inventor: George MacDonald, Garrettsville, Ohio

[73] Assignee: Duramax Marine, LLC, Middlefield, Ohio

[21] Appl. No.: 08/876,092

[22] Filed: Jun. 13, 1997

Related U.S. Application Data

[62] Division of application No. 08/316,883, Oct. 3, 1994, Pat. No. 5,639,098.

[51] Int. Cl.$^7$ .............................. F16J 15/34; B63H 23/36
[52] U.S. Cl. ........................ 277/370; 277/377; 277/391; 440/112
[58] Field of Search .................................... 277/358, 370, 277/377, 391, 398, 607, 630, 634; 440/83, 112; 464/180, 182, 177

[56] References Cited

U.S. PATENT DOCUMENTS

| | | | |
|---|---|---|---|
| 1,234,370 | 7/1917 | Meyer | 440/112 |
| 2,115,346 | 4/1938 | Summers . | |
| 2,122,378 | 6/1938 | McCormack | 277/88 |
| 2,306,664 | 12/1942 | Scott-Paine | 440/112 |
| 2,397,290 | 3/1946 | Rasmussen . | |
| 2,425,441 | 8/1947 | Riley | 440/112 |
| 2,562,624 | 7/1951 | Loofbourrow . | |
| 3,081,099 | 3/1963 | Walker et al. | 277/88 |
| 3,526,408 | 9/1970 | Tracy | 277/88 |
| 3,529,839 | 9/1970 | Greiner et al. | 277/91 |
| 3,599,990 | 8/1971 | Greiner et al. | 277/4 |
| 3,751,046 | 8/1973 | Golubev et al. . | |
| 3,822,066 | 7/1974 | Keys | 277/96 |
| 4,085,941 | 4/1978 | Wilkinson et al. | 277/3 |
| 4,095,807 | 6/1978 | Jandt et al. | 277/40 |
| 4,165,081 | 8/1979 | F'Geppert . | |
| 4,293,304 | 10/1981 | Sandstrom et al. | 440/83 |

(List continued on next page.)

FOREIGN PATENT DOCUMENTS

| | | |
|---|---|---|
| 133073 | 2/1985 | European Pat. Off. . |
| 1269852 | 6/1968 | Germany . |
| 508776 | 7/1939 | United Kingdom . |

OTHER PUBLICATIONS

"Stuffing Box Black and Blues: OEM Alert," *Marine Business Journal*, J. Kalvin, Oct. 1993.
"Boatkeeper—No More Stuffing Boxes?" by Bernard Gladstone, *Motor Boating & Sealing/Boatkeeper*, Nov. 1993.
Advertisement: "Lasdrop Shaft–Seal/'The Dripless and Maintenance–Free Shaft Seal.'"
Advertisement: "Lasdrop Shaft–Seal/End Stuffing Box Leaks".
Advertisement: "PSS Packless Sealing System/Dripless, Maintenance–Free Stuffing Box Replacement System for Shafts from 3/4: to 8".
Advertisement: "PSS Shaft Seal Stuffing Box Replacement Unit."
Advertisement: MAC–SEAL.
Advertisement: "Norscot Propeller Shaft Seal".
Advertisement: "Strong Seal Self Aligning Shaft Seal".
Advertisement: "Real Seal".
Advertisement: "Exalto Hollex Seals".
Advertisement: "Max–Prop V.P."

*Primary Examiner*—Anthony Knight
*Assistant Examiner*—John L. Beres
*Attorney, Agent, or Firm*—D. Peter Hochberg

[57] ABSTRACT

An adjustable sealing device for sealing between rotatable drive shaft, such as a propeller drive shaft, and the aperture in a structure, such as the hull or bulkhead of a vessel, through which the shaft passes. The device is generally rigid and is comprised of an adapter ring, a slide ring, a diaphragm positioned between the adapter ring and the slide ring, a friction ring having one end positioned in the adapter ring and a seal surface engageable with the seal surface of a seal ring rotatable with the shaft, biasing means positioned between the slide ring and the friction ring for urging the seal surfaces together, and a spring cover acting as a seal redundant to the diaphragm.

7 Claims, 23 Drawing Sheets

U.S. PATENT DOCUMENTS

| | | | |
|---|---|---|---|
| 4,429,884 | 2/1984 | Matsumoto | 277/93 |
| 4,451,049 | 5/1984 | Charhut . | |
| 4,482,159 | 11/1984 | Ishitani et al. | 277/3 |
| 4,648,605 | 3/1987 | Marsi | 277/89 |
| 4,732,396 | 3/1988 | Brigham et al. | 277/3 |
| 4,936,593 | 6/1990 | Finney | 277/88 |
| 4,997,191 | 3/1991 | Warner | 277/9 |
| 5,013,050 | 5/1991 | Lansdale | 277/9.5 |
| 5,199,719 | 4/1993 | Heinrich et al. . | |
| 5,209,497 | 5/1993 | Von Bergen et al. | 277/28 |
| 5,340,121 | 8/1994 | Lewis et al. . | |

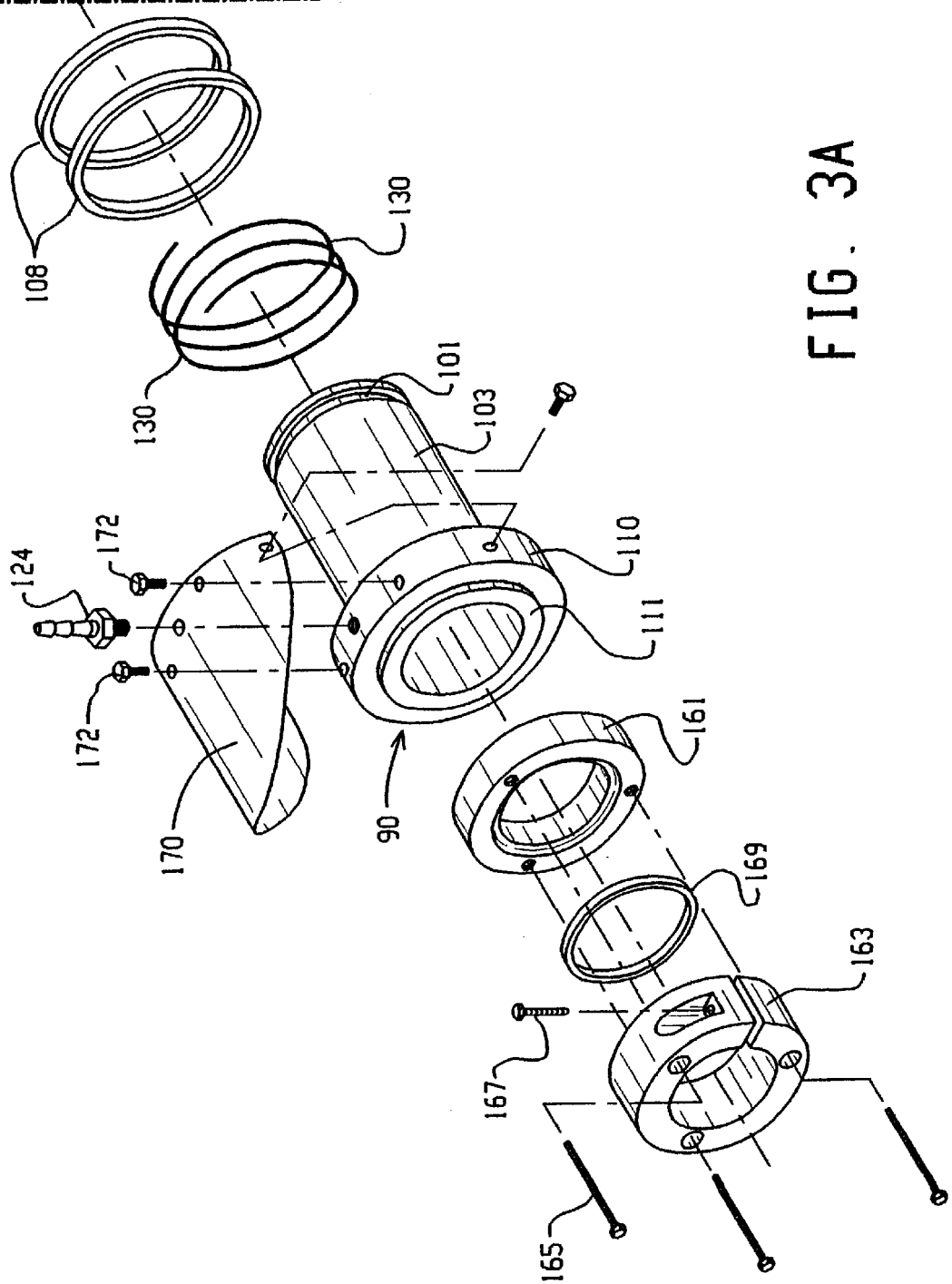

MATCH TO FIG. 3A

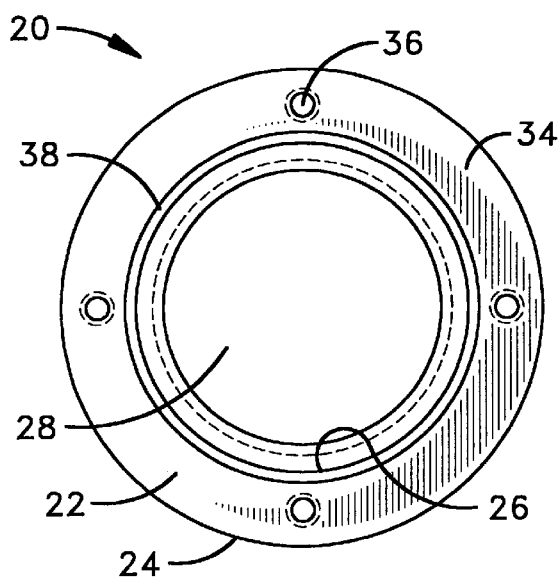
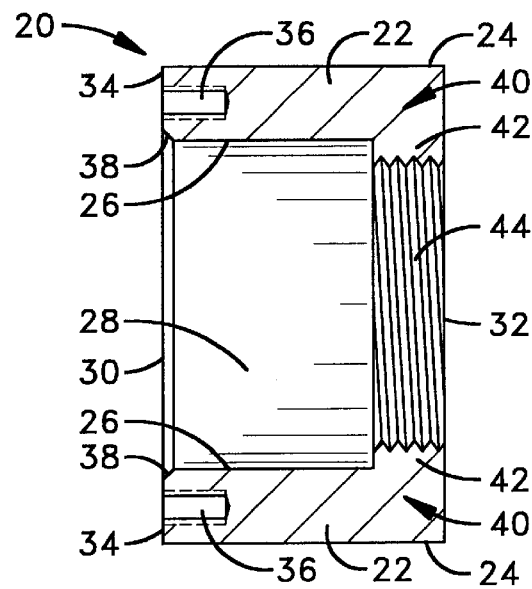
FIG. 7    FIG. 8
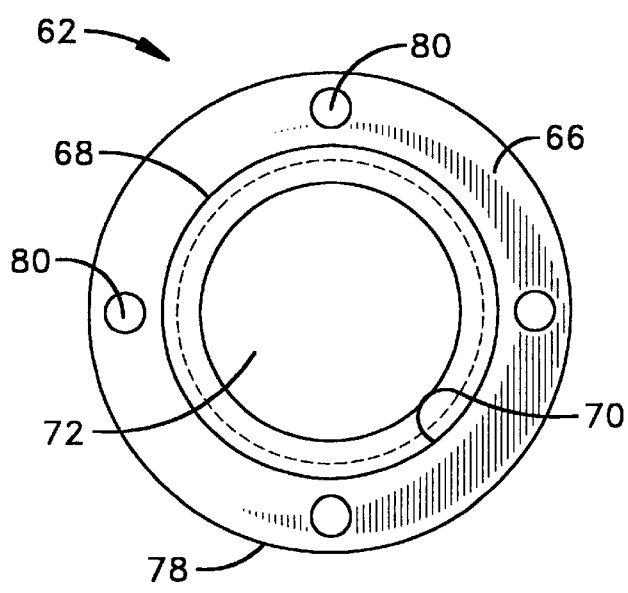
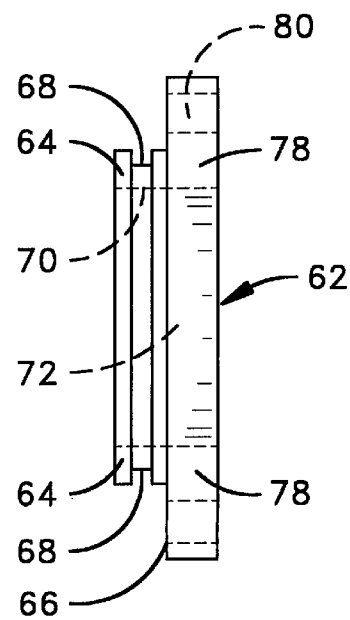
FIG. 12    FIG. 13

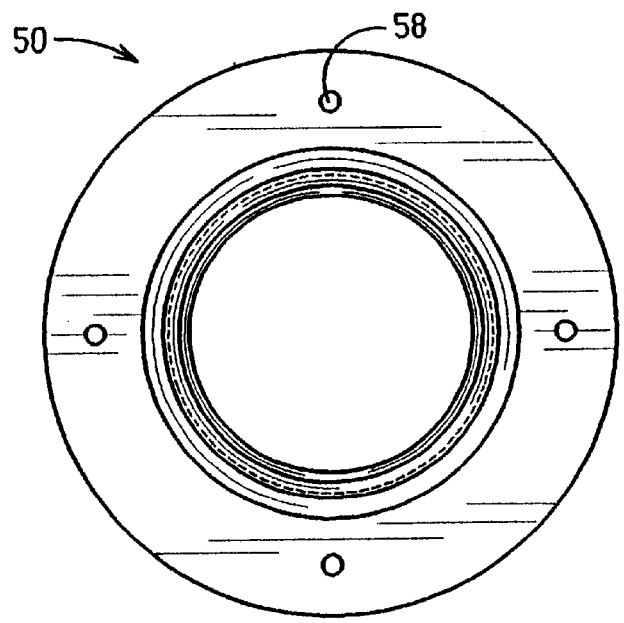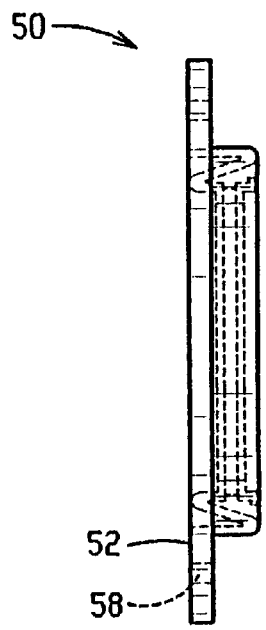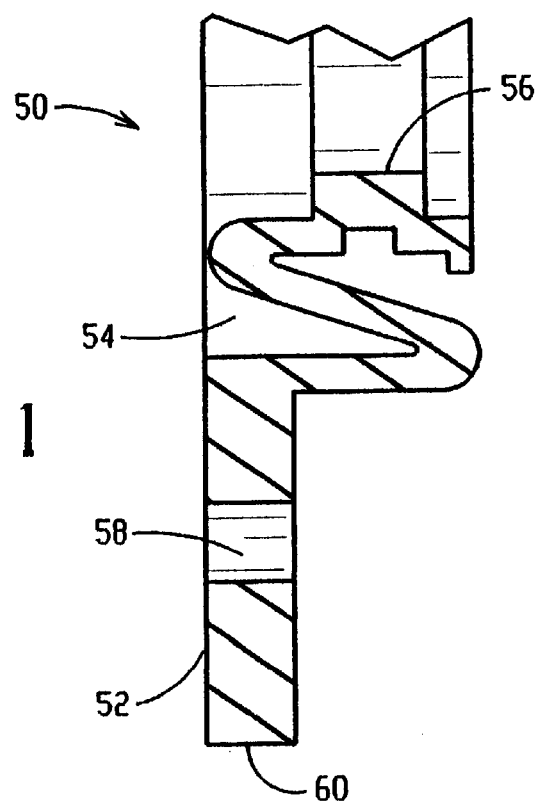
FIG. 9
FIG. 10
FIG. 11

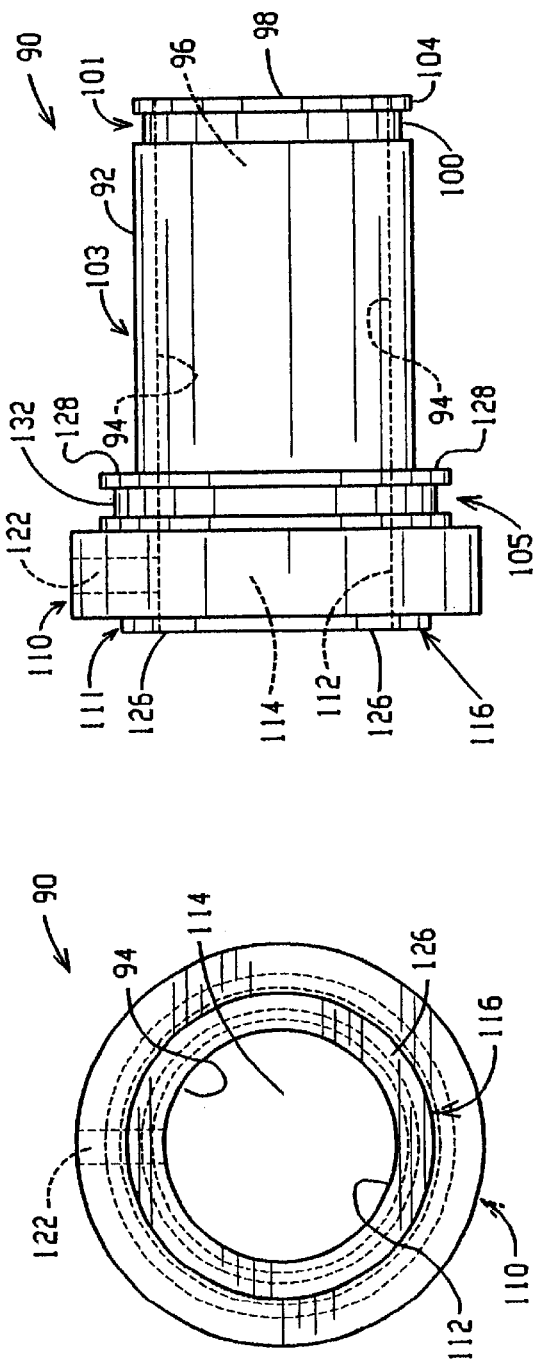
FIG. 15
FIG. 14
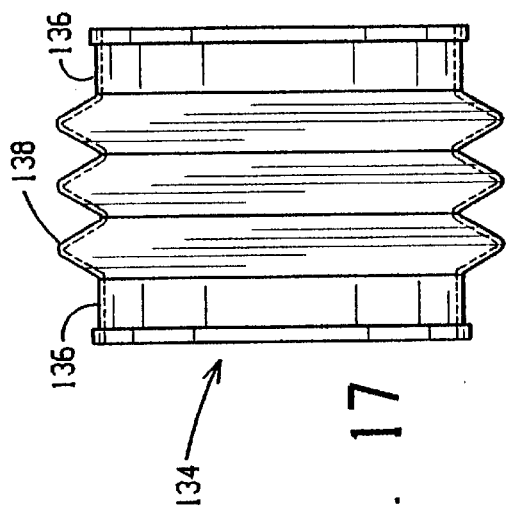
FIG. 17
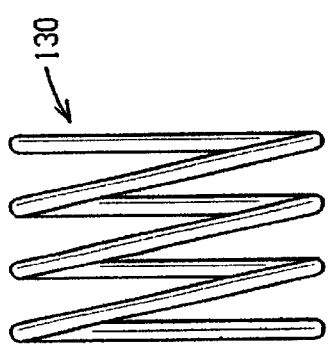
FIG. 16

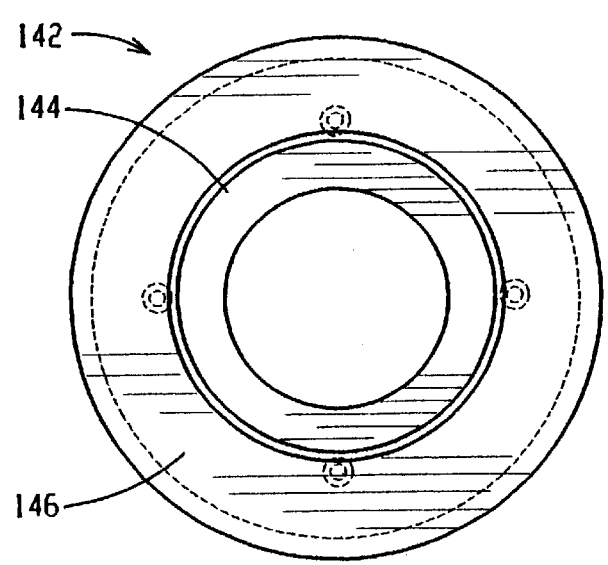
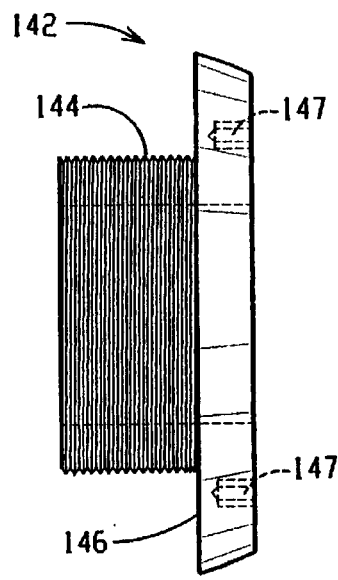
FIG. 18  FIG. 19
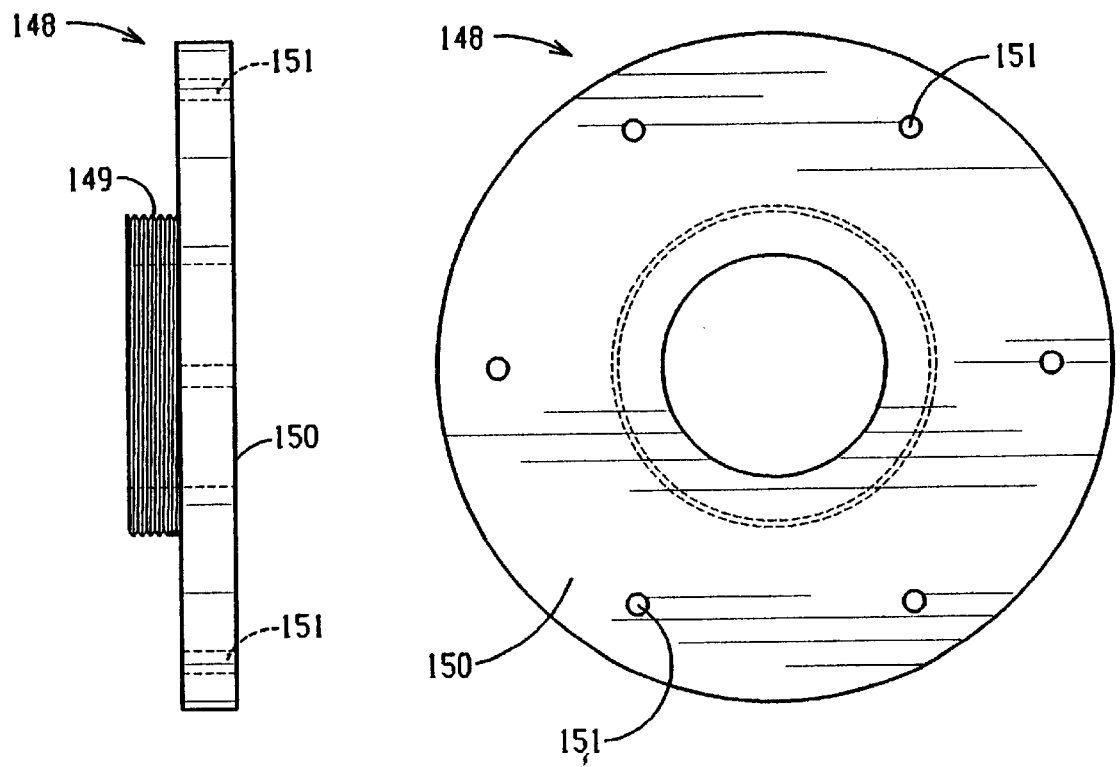
FIG. 20  FIG. 21

ADJUSTABLE SEAL FOR PROPELLER DRIVE SHAFT

This application is a division of U.S. patent application Ser. No. 08/316,883 filed on Oct. 3, 1994, which issued as U.S. Pat. No. 5,639,098 on Jun. 17, 1997.

FIELD OF THE INVENTION

The present invention relates generally to devices for creating a fluid-tight seal between a rotatable shaft and a structure through which the shaft passes, and more particularly to a watertight seal between the propeller drive shaft in a boat or other water vessel and an aperture in the hull of the vessel through which the shaft passes.

BACKGROUND OF THE INVENTION

There are many design situations in which a rotatable shaft must pass through a wall structure into a fluid medium. Often the aperture in the wall structure through which the shaft passes must be sealed in order to retain the fluid on one side of the wall. One such situation is a propeller drive shaft extending from the interior of the hull of a vessel to the exterior, passing through an aperture in the hull. The aperture must be sealed to prevent water from entering the vessel. Several devices for sealing such apertures have been developed and are discussed below.

Stuffing boxes generally consist of a bronze or other metallic housing or plate which is fastened over the aperture in the hull of the vessel and includes a hollow, cylindrical tube which extends into the vessel. The propeller drive shaft is received in the cylindrical tube, and passes through the housing and through the aperture. In most applications for pleasure craft, stuffing boxes include a metallic nut, which can be threadingly received in the cylindrical tube, inserted on the propeller shaft. A sealing material or gland, such as packing rings, which can be wax or graphite impregnated braided flax rope is provided. The packing rings are cut and placed around the propeller drive shaft between the metallic nut and inside the cylindrical tube. The brass nut is then threaded into the cylindrical tube and tightened against the packing rings, compressing the packing against the propeller drive shaft in an attempt to create an essentially watertight seal.

When stuffing boxes are used on commercial vessels having large diameter propeller drive shafts, the packing is contained within the body of the stuffing box. Instead of the metallic nut used with pleasure craft, as described above, a housing cover or cap is provided to compress the packing. Threaded fasteners extend through the cover or cap and are received in threaded bores in the stuffing box.

Stuffing boxes have numerous problems. Packing seals against the rotating shaft and causes wear damage to the shaft. Many problems with stuffing boxes are associated with the fact that they need constant adjustment. When the propeller shaft is operating, the packing gland should be somewhat loose to permit adequate amounts of water to enter the stuffing box to moisten the packing and cool and lubricate the rotating shaft. If no water enters there is no lubrication and the friction between the rotating shaft and the packing increases, causing the shaft to become hot. This damages the packing and makes the shaft more susceptible to being scored, and the shaft may have to be repaired or replaced.

After operation and before the vessel is docked, the stuffing box should be tightened to keep all water from entering the vessel. Due to the difficulty and inconvenience in accessing the stuffing box, most vessel operators do not adjust it as frequently as they should. Therefore, excess water often enters the vessel when it is docked, because the stuffing box may still be loose, and a bilge pump is used to pump the water outboard. Bilge pumps can fail or malfunction, however, and most inboard water damage to vessels occurs because water enters through the packing gland, and the bilge pump subsequently malfunctions.

Another major problem with stuffing boxes is that they can leak, even when adjusted properly. Compressed flax is not impervious to water. Another problem with stuffing boxes is that there is very little flexibility transverse to the axis of the shaft in a packing gland. As the vessel is driven backward and forward, the shaft moves back and forth and vibrates or wobbles as it rotates. The movement of the shaft eventually creates gaps in the packing rings, and water leaks through the gaps.

Another problem with stuffing boxes is that the packing wears out quickly due to the normal rotation of the shaft. As it wears, more water enters the vessel causing expensive vessel maintenance, both in the form of repairs to the vessel and frequent replacement of the packing. In this respect, when the packing is replaced, the vessel may need to be lifted out of the water which is an expensive, time-consuming operation. Even when used and maintained properly, stuffing boxes need to be repacked about every six months to two years, depending on hours of use and operating conditions. To properly repack a stuffing box in some vessels, the back of the vessel may have to be removed from the water. This is expensive and inconvenient. In some situations, as where air-sealed stuffing boxes from Duramax, Inc. are employed, the vessel need not be removed from the water.

Another problem with stuffing boxes is that if the nut is too tight, the heat due to friction can increase to the point where the nut heats up and "freezes" to the shaft. If this happens, the stuffing box can be ripped free of the hull aperture, flooding the vessel.

A additional problem with stuffing boxes is that the housing is dimensioned for one specific vessel hull aperture configuration. Stuffing boxes therefore cannot be easily retrofitted into vessels with hull aperture configurations different than that for which the stuffing box was designed.

Another problem with stuffing boxes is that they cannot be adjusted to align with the axis of the shaft. Therefore, the shaft is often not aligned with the cylindrical tube on the stuffing box through which it passes, making it difficult to obtain a tight seal and to avoid damage to the shaft.

Additionally, the water which enters a vessel must be pumped outboard. Water entering the bilge through the stuffing box mixes with oil and other contaminants in the bottom of the vessel. The bilge pump pumps the water, mixed with the contaminants, into the surrounding water. The Federal Water Pollution Control Act prohibits discharge of oil or oily waste into or upon navigable waters of the United States or the waters of the contiguous zone if such discharge causes a film or sheen upon or a discoloration of the surface water.

To alleviate the problems with stuffing boxes, mechanical seals were developed. Mechanical seals need no repacking, little maintenance and, if properly selected and installed, virtually eliminate water from entering the bilge. The life span of a mechanical shaft seal if correctly adjusted is approximately 10,000 to 15,000 operating hours. Putting this into perspective, a busy season for a pleasure vessel is 600 hours and a commercial vessel operates approximately 2,000 to 5,000 hours per year. Therefore, this equates to a minimum of two years and a maximum of twenty-five years of use. The most common mechanical seals are the "lip" seal and "face" or "surface" seal.

The lip seal is a flexible, stationary annular seal, usually made from rubber, which surrounds and fits tightly against the propeller drive shaft creating a seal while allowing rotation of the shaft. Lip seals have a number of problems when used in marine applications. First, lip seals tend to wear grooves in the propeller drive shaft, which is usually made of stainless steel. Once a groove is worn into the steel, water tends to leak past the groove. Further, the groove creates a weak point in the shaft. The shaft must then be repaired by welding or replaced. Second, any shaft misalignment or cross-axial shaft vibration causes leakage because the lip seal is not flexible enough to compensate for a shaft not centered within the seal. Third, the rubber in the lip seal must remain supple in order to conform to the surface of the shaft. The rubber seal is exposed, however, to a harsh environment of salt water, oil, hot and cold temperatures, and loses its softness quickly, leading to water leakage.

The most popular mechanical seal used for rotating propeller shafts is the face or surface seal. The face seal comprises two finely machined sealing surfaces pressed together to form a watertight seal. In marine applications, the sealing faces or surfaces are typically facing, axially-perpendicular flat sides of two annular rings, one of which is mounted on a rotating shaft, such as a propeller drive shaft. In this respect, each ring has an inner diameter defining a center bore or opening dimensioned such that the rings can be slidingly mounted onto the propeller drive shaft. (Optionally, either ring can be provided in two pieces and fastened onto the shaft whereby the pieces are joined by compression screws.) Each ring also has an outer diameter, and a flat annular sealing surface defined between the inner and outer diameters. One of the two rings is called the seal ring and is fixed to the propeller shaft and, therefore, rotates with the shaft. The other ring is called a friction ring, which is typically stationary and fastened to a housing through which the propeller shaft passes. The annular sealing surface of the seal ring mates with the annular sealing surface of the friction ring, creating a watertight seal. In standard face or surface seal devices, a loading or biasing means such as a spring or rubber bellows biases the friction ring and seal ring together and provides a compression force that helps create and maintain the seal.

A major advantage of a face seal is that it does not seal against the propeller shaft. As opposed to a lip seal or to a stuffing box, therefore, face or surface seals allow the shaft to rotate with less resistance, resulting in better performance and improved fuel economy. Additionally, the seal will not wear the propeller shaft.

One common type of surface seal uses a carbon-graphite friction ring and a stainless steel sealing ring. Although these materials usually function well, there are problems associated with them. The carbon-graphite friction ring is brittle, making it susceptible to cracking, and it is easily scratched or pitted, which can lead to leakage between the sealing surfaces. Further, carbon graphite and stainless steel are dissimilar materials and the contact between the two can lead to crevice corrosion and degradation of the seal face. As it will be understood, any imperfections in the friction ring caused by corrosion of the surface or by scratches in the surface will cause leakage at the seal face.

Another problem which occurs with the stainless steel seal ring is that the ring may be secured to the shaft with set screws. The set screws are usually stainless steel and electrically connect the set screw seal face to the shaft, promoting electrolysis on the seal face.

Another problem with surface seals is that maintaining proper compression between the two seals is critical. As the shaft moves in the axial direction in response to the reverse or forward thrust of the propeller, the compression between the sealing surfaces varies. Too much pressure between the seal ring and friction ring causes undue wear of the seal, and too little pressure allow leakage between the seals.

It is known to use a convoluted neoprene rubber bellows to load or bias the friction ring towards the seal ring to maintain pressure between the two. The biasing force of the rubber bellows is largely dependent on the durometer of the rubber. As the rubber is exposed to the environment and ages, it loses its elasticity and the amount of tension on the seal face decreases. This results in leakage and the need to adjust the position of the seal ring on the shift in order to compress the bellows more to increase the compressive force between the seal ring and friction ring.

A wire-reinforced rubber bellows surface seal device was introduced in the late 1980's. It is easy to install and remove, and it maintains a generally constant pressure between the seal ring and friction ring, thereby extending the life of the seal. The wire-reinforced rubber bellows seal device is comprised of three main components: a rigid stern tube, a rigid friction ring and a flexible hose connecting the two. The center of the hose is a bellows structure reinforced with a stainless steel coil spring. One end of the hose is clamped over the stern tube and the other end is clamped over the friction ring. The propeller shaft passes through the friction ring, the flexible hose and the stern tube. The seal ring is fixedly attached to the shaft, adjacent the friction ring. The rubber bellows and spring bias the friction ring towards the seal ring, thereby maintaining relatively constant pressure between the two. The spring eliminates the loss of compressive force associated with degradation of the rubber.

It has been known to make the friction ring of the wire-reinforced bellows of high impact, high temperature, oil-impregnated cast nylon. This material is extremely impact resistant, can withstand heat of approximately 350° to 400° F. and has a very low water absorption rate. Therefore, it will not crack like the brittle carbon-graphite friction rings. Further, because it is plastic, the problems associated with carbon-graphite seals such as electrolysis and crevice corrosion are eliminated. In addition, the seal ring can be electrically insulated from the vessel. Compression screws fasten the shaft clamp to the seal ring. The shaft clamp can compress a rubber or plastic O-ring against the seal ring thereby wedging the O-ring between the seal ring and the shaft, electrically isolating the stainless steel seal ring from the propeller shaft.

When surface seals are in use, a thin film of water should remain between the two seal faces. This thin film acts as a lubricant on the seal faces and keeps the faces cool, extending the life of the seal. On a displacement hull, bleeding off any trapped air in the seal allows water to reach the seal faces, keeping them lubricated. On a high speed hull, a vacuum is drawn in the stern tube as the speed of the vessel increases. Water can then be injected into the seal to keep the seal face lubricated. The wire-reinforced rubber bellows surface seal heretofore described has utilized an air vent/ water injection fitting which can either remove air from or inject water to the sealing surfaces.

As stated above, the wire-reinforced rubber bellows surface seal was an improvement over stuffing boxes, lip seals and other surface seals. It provided a surface seal arrangement wherein the friction ring would move forward or aft by means of the flexible tube and spring-loaded bellows, in response to axial movement of the propeller shaft and the seal ring fixed to the shaft. Therefore, surface pressure between the two sealing surfaces was constantly maintained without the sealing faces being excessively compressed. This seal still had a number of problems, however. First, because the rubber hose is soft and flexible, it can be moved or dislodged by a person stepping on it or by objects striking it. When the rubber hose is moved or dislodged, the seal faces are moved out of alignment, thus interfering with the sealing contact, and substantial leakage occurs. Additionally, as with all prior art seals, this seal cannot be adjusted to the axis of the propeller shaft after it is installed, nor can it be easily retrofitted onto different vessel hull/aperture configurations.

The present invention overcomes the disadvantages of the prior art by providing an adjustable surface or face-sealing device, easily adaptable to most hull aperture configurations, which can be aligned with the axis of the propeller drive shaft after it is installed, and which is constructed of rigid components so that force applied to the device will not dislodge the sealing surfaces.

BRIEF SUMMARY OF THE INVENTION

In accordance with the preferred embodiments of the invention, there is provided a shaft seal system for use with a vessel, such as a vessel, where the drive or propeller shaft extends from an inboard engine or gear box, through the hull or bulkhead, to an outboard drive means, such as a propeller. The shaft seal system prevents the flow of water through the opening in the hull or bulkhead, into the vessel and out of the confines of the system. Considering the system from aft to forward, there is provided an appropriate adapter that fills the hull opening, and which is connected to adapter ring which is connected to a sea gasket or diaphragm which is in turn connected to a slide ring and to a friction ring. The friction ring has a seal face which is engageable with the seal face of the seal ring as discussed later, and a rearwardly extending body which goes around the shaft. The diaphragm is attached to the friction ring body. Between the slide ring and the friction ring are biasing means, such as a tension spring, for loading or biasing the friction ring forwardly to put enough pressure on the seal surface of the seal ring to establish a dynamic and a static watertight seal. The seal ring is connected to and held in place on the shaft by a shaft clamp. A spring cover extends over the tension spring and is attached to the slide ring and to the friction ring. As described below, the flow of water is precluded or prevented by the diaphragm, and the spring cover is redundant to the diaphragm.

This unit is rigid, and it will not be disrupted if it is stepped on or impacted during the use of the device. This is a very important feature of the invention, since this is one of the major causes of catastrophic failure of the prior art devices.

Another important feature of the invention is the adapter ring and the components which are used with it. The adapter ring enables the system to be used with many other devices through which the propeller shaft passes in penetrating the bulkhead or hull of the vessel. As discussed below, the adapter ring is internally threaded for receiving the thread of a variety of cooperating components. For example, a thru-hull adapter ring can be extended through the hull of a ship and its external threads can be threaded into the internal threads of the adapter ring, to hold the system in place and prevent the flow of water into the vessel and out of the shaft seal system. Alternatively, a flange ring could be used for attaching the system to a stern tube which runs through an opening in the hull, or the flange ring itself could be attached to the hull. In another well-known arrangement, a hose adapter can be connected to the adapter ring, and also to a hose which leads to a stern tube which extends through the opening in the hull of the vessel for providing a path for the shaft into the vessel.

An important part of the preferred embodiment of the invention are the means for preventing the flow of water through the system. In particular, the diaphragm, such as a sea gasket, must be able to prevent the flow of water out of the shaft seal system, but also must be sufficiently flexible to allow the friction ring to move fore and aft as the shaft moves fore and aft. The diaphragm has an annular section which is connected to the friction ring. The diaphragm is configured to receive one or more O-rings as a clamp for attaching the diaphragm to the friction ring in a watertight manner, and the friction ring is configured to receive the diaphragm with the O-rings clamping the connection. The other end of the diaphragm includes an annular section which is attached to the slide ring by screws, such as centering screws. The arrangement with the centering screws enables the changing of the longitudinal axis of the passage through the system as the axis of the shaft changes. The coaxial centering screws thus enable the longitudinal axis of the passageway to be coaxial with the longitudinal axis of rotation of the propeller shaft. A convoluted section of the diaphragm connects the two annular attachment sections. The diaphragm is able to move fore and aft because of the flexibility provided by the convolutions to enable the diaphragm to serve its watertight function. The slide ring is another important part of the preferred embodiments of the invention. The slide ring is required in order to provide a mounting location for the diaphragm. The slide ring also provides a support structure for the tension spring which urges the friction ring towards the seal ring. Also, the slide ring cooperates with the friction ring and guides the friction ring during its limited axial movement as the shaft moves fore and aft.

The flexible nature of the system, referring specifically to the diaphragm and the spring cover, enables the seal surface of the friction ring and the seal ring to remain effective even if they become somewhat misaligned, while not impairing the important rigidity of the system.

It is an object of the present invention to prevent water from entering a vessel and leaving the confines of the shaft seal system according to the invention, where the vessel has a propeller shaft extending from an inboard motor or gear box to an outboard propeller.

Another object of the invention is to provide a system for preventing water from entering a vessel having a shaft which extends through the hull or bulkhead of the vessel, even if the shaft of the vessel changes its position radially or axially.

Still another object of the invention is to provide a system for preventing water from entering a vessel having a propeller shaft which extends through the hull or bulkhead of the vessel, where the system is rigid and can withstand impact forces which might damage or dislodge other shaft-sealing systems.

Still a further object of the invention is to provide a water-sealing system for a vessel which remains effective even if portions of the system become misaligned during operation of the system.

It is also an object of the invention to provide a system as described above which contracts and elongates in order to adjust for axial movement of the drive shaft during the operation of the vessel to prevent damage to the sealing components of the system an(d to maintain the integrity of the seal.

It is yet another object of the invention to provide a system for sealing against a flow of water where the longitudinal axis of the system moves from the axis of the drive shaft.

A further object of the invention is to provide a fluid-sealing device for a vessel having a shaft which runs through the hull or bulkhead of the vessel which can be used with many different types of apparatus for receiving a shaft where it extends through the hull or bulkhead.

Another object of the invention is to provide a fluid-sealing device for use with a vessel having a shaft which extends from a motor or gear box inboard to a propeller outboard of the vessel, which can easily be used with various types of thru-hull adapter rings, flange adapters, hose adapters, stern tube clamp adapters and the like through which propeller shafts extend through the hull or bulkhead.

Another object of the present invention is to provide a device as described above to which adapters may be attached, each respective adapter adapting the device for mounting to a different hull aperture configuration.

Another object of the present invention is to provide a sealing device as described above wherein the friction ring is made of a durable material such as oil-impregnated nylon.

Another object of the present invention is to provide a device as described above which includes a secondary seal in case one of the primary seals fails.

Another object of the invention is to provide a water-seal apparatus for the shaft of a vessel which is safe in operation, durable and easy to make, uses known components and raw materials, and which furthermore is effective, efficient and reliable in operation.

Other objects will become apparent from the description to follow and from the appended claims.

BRIEF DESCRIPTION OF THE DRAWINGS

FIGS. 3A and 3B are exploded views of the system shown in FIG. 1.

FIG. 7 is an end view of the adapter ring shown in FIG. 1.

FIG. 8 is a cross-sectional view of the adapter ring shown in FIG. 7.

FIGS. 9, 10 and 11 are end, side and cross-sectional views, respectively, of a diaphragm used in FIG 1.

FIGS. 12 and 13 are end side views of a slide ring used in accordance with the apparatus of FIG. 1.

FIGS. 14 and 15 are end and side views, respectively, of a friction ring used in the apparatus of FIG. 1.

FIG. 16 is a side view of a coil spring used in the apparatus of FIG. 1.

FIG. 17 is a side view of a spring cover in accordance with the system of FIG. 1.

FIGS. 18 and 19 are end and side views, respectively, of a thru-hull adapter ring used with the system of FIG. 1.

FIGS. 20 and 21 are side and end views, respectively, of an adapter flange usable with the system of FIG. 1.

DETAILED DESCRIPTION OF A PREFERRED EMBODIMENT

Figure 1:
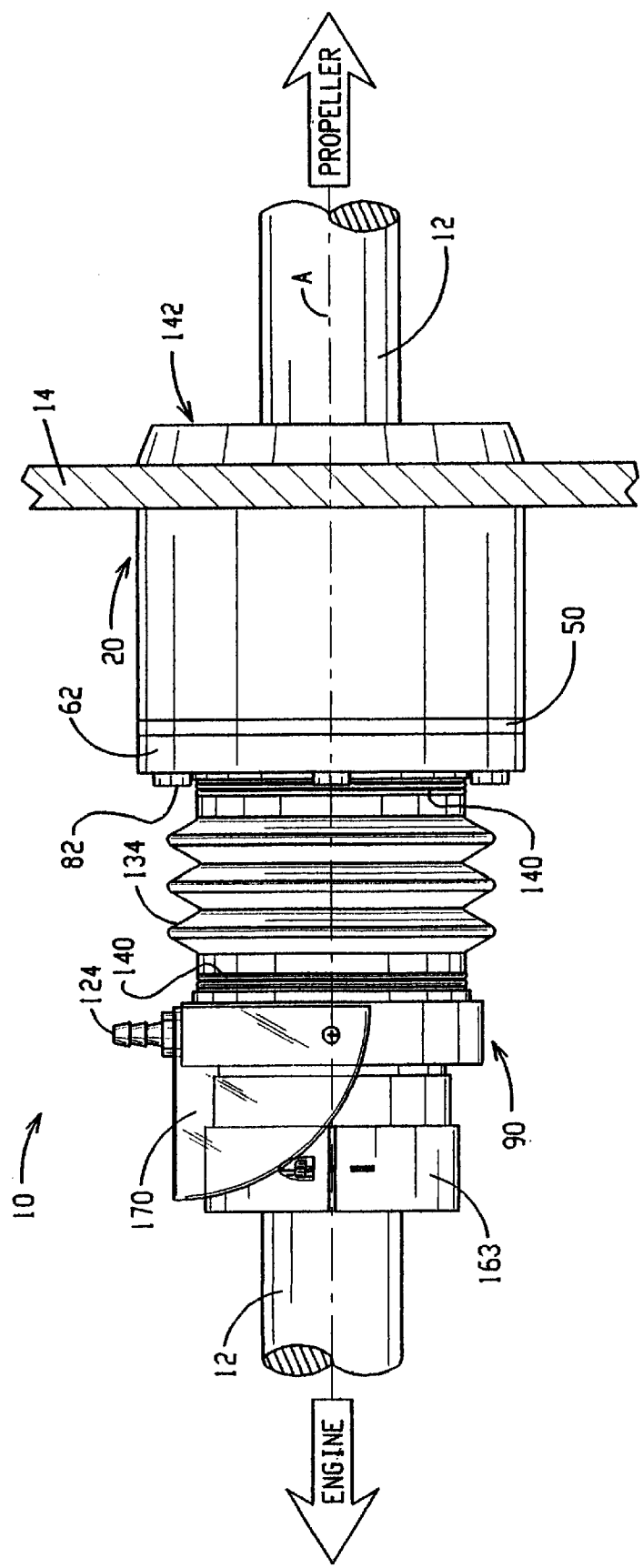
FIG. 1 is a side view of a preferred embodiment of the present invention used in conjunction with a propeller drive shaft of a vessel.

Turning now to the drawings where the purpose is for illustrating a preferred embodiment of the invention, a shaft sealing device 10 for sealing between a shaft 12 and a wall structure such as a hull 14 is shown in FIG. 1. The right and exterior end of shaft 12 is connected to the propeller of the vessel, and the left and interior end is connected to the engine or gear box of the vessel. Sealing device 10 has a passageway for the shaft with a generally longitudinal axis A, which also should be the axis of rotation of shaft 12. Sealing device 10 is comprised of an adapter ring 20, a sea gasket or diaphragm 50, a slide ring 62, a friction ring 90, and a loading or biasing means 130 (FIG. 2) within a spring cover 134. A seal ring 161 is affixed to shaft 12 and held there by a shaft clamp 163. A safety shield 170 is attached to friction ring 90.

Figure 2:
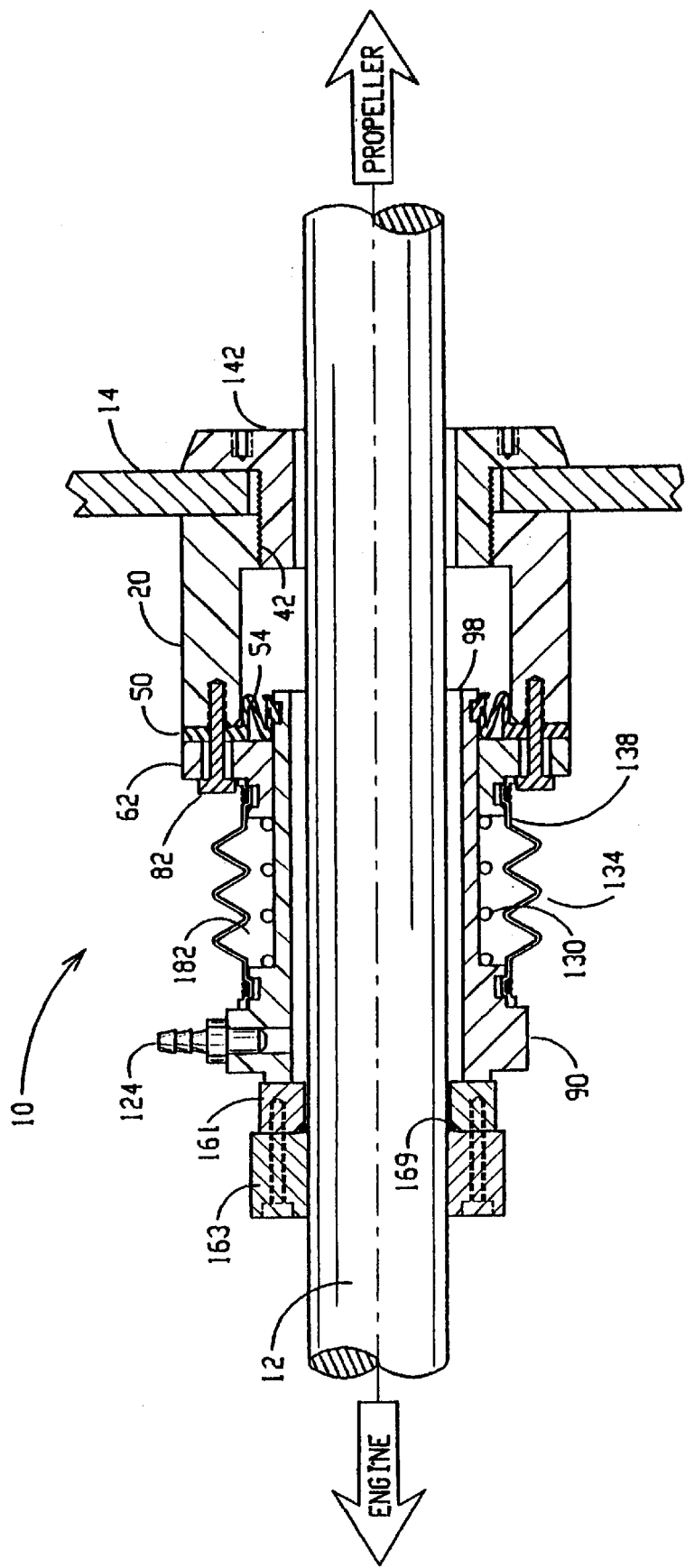
FIG. 2 is a side, partially cut away, sectional view of the system shown in FIG. 1.
Figure 3B:
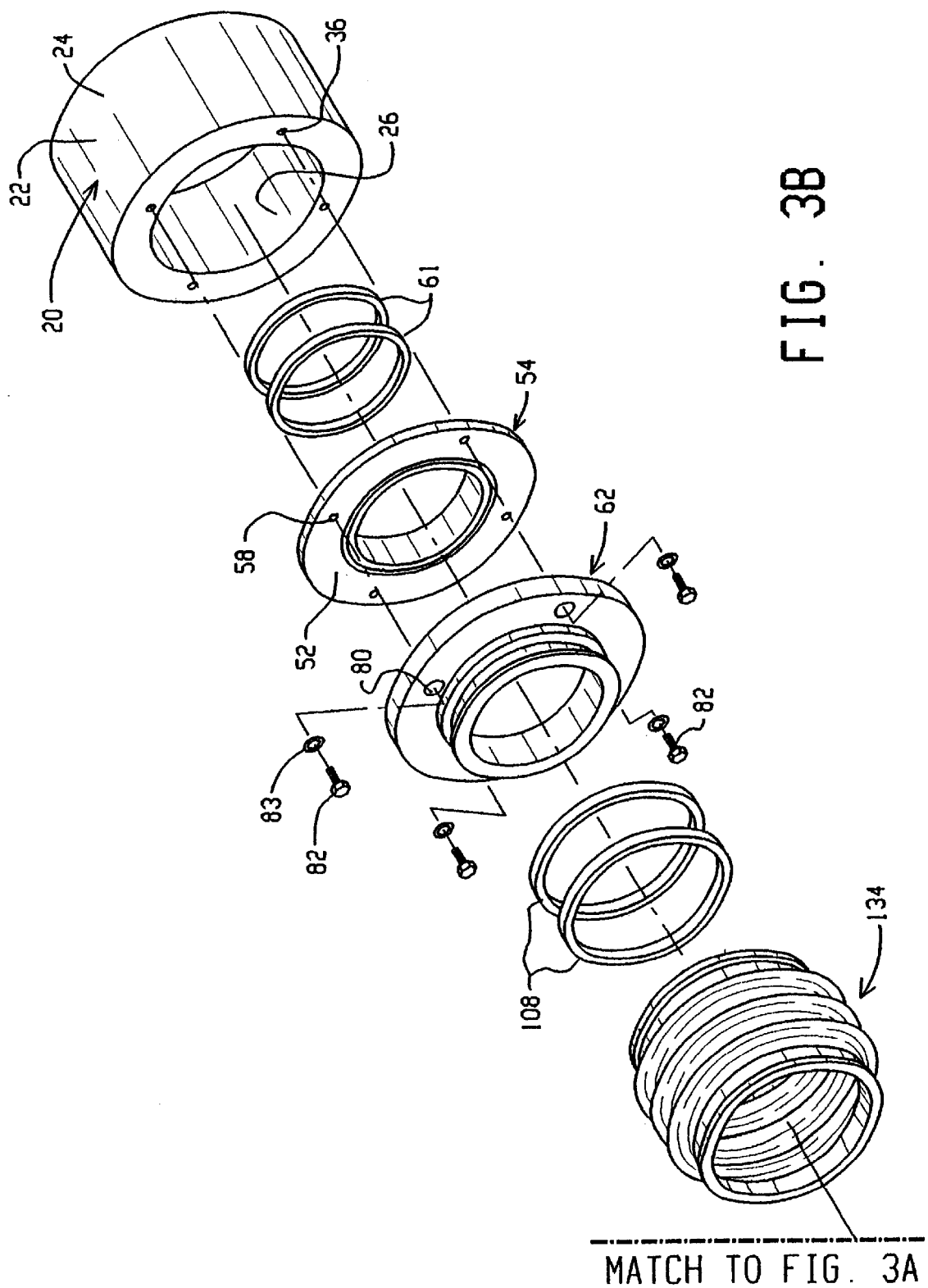

Turning now to FIGS. 2 and 3, adapter ring 20 is generally a hollow cylindrical tube hiving a wall 22. Wall 22 has an annular outer surface 24 and an annular inner surface 26, which are best seen in FIGS. 2, 4, 5, 7 and 8. Inner surface 26 defines a generally cylindrical cavity 28. Adapter ring 20 has a first end 30 and a second end 32, as is best seen in FIG. 8, each end being open and communicating with cavity 28. A mounting surface 34 is generally planar and radial and is formed in wall 22 at the first end 30 of adapter ring 20. Four equally radially spaced mounting bores 36 are formed in surface 34. Bores 36 are aligned along respective longitudinal axes (not shown) which are parallel to axis A. Angled recess 38 is formed in surface 34 adjacent cylindrical inner surface 26.

A receiving portion 40 is formed in wall 22 at the second end 32 of adapter ring 20 and extends perpendicularly from wall 22 into cavity 28. Section 42 of receiving portion 40 is threaded as shown at item 44 in the preferred embodiment and can be threadingly engaged with adapter sections, as will be discussed in detail below.

Figure 5:
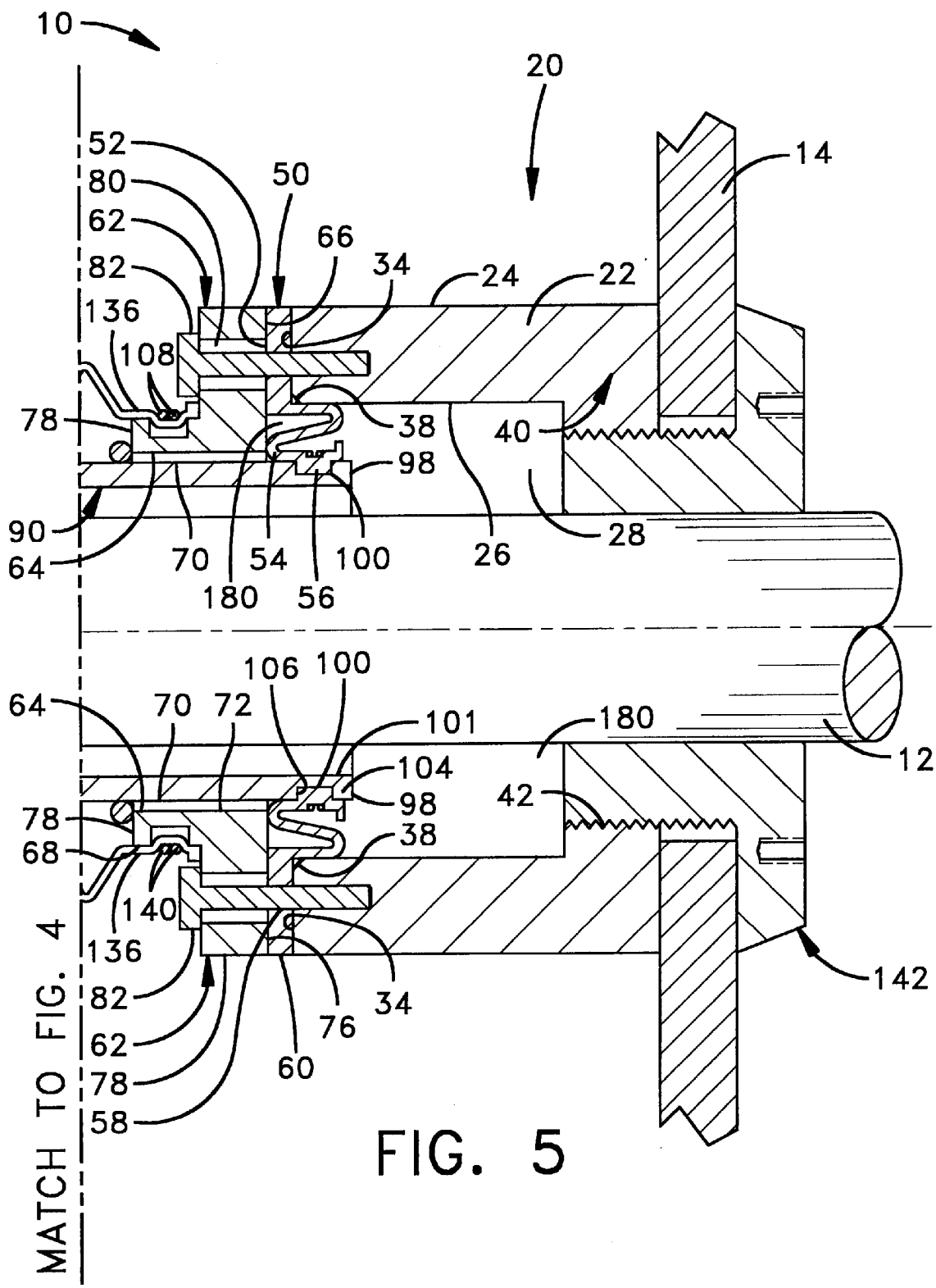
FIG. 5 is a partial enlarged view showing the back portion of the device shown in FIG. 2

Diaphragm 50, best seen in FIGS. 2, 9, 10 and 11, is flexible and preferably formed of rubber or other resilient material which is resistant to salt water. Diaphragm 50 includes a radial base 52, a convoluted body 54 and an annular foot 56. Base 52 is generally smooth and perpendicular to axis A and has four equally radially spaced apertures 58, best seen in FIGS. 3 and 11, formed therein and an outer annular edge 60. Base 52 is mounted on mounting surface 34, as best seen in FIGS. 2 and 5, with apertures 58 aligned with mounting bores 36. Outer edge 60 of base 52 extends beyond cylindrical outer surface 24, as can be seen in FIGS. 2 and 5. O-rings 61 hold the rearward part of diaphragm 50 to the rearwardly extending body of friction ring 90.

Convoluted body 54 extends from base 52 into cavity 28. Foot 56 is formed at an angle to leg 54 and is generally parallel to axis A and is attachable to friction ring 90 to create a watertight seal, as will be discussed below.

Slide ring 62, best seen in. FIGS. 2, 3B, 12 and 13, is generally a hollow, cylindrical tube having a wall 64 composed of a series of annular surfaces, and a radial base 66 which is perpendicular to wall 64. Wall 64 has an outer surface 68 and an inner surface 70 defining a cavity 72 adjacent cavity 28. Slide ring 62 has a first end 74 and a second end 76, best seen in FIG. 13, wherein each end is open and in communication with cavity 72. A support surface 78 is generally flat and annular and is formed at the first end 74 of base 66. Base 66 has four or more apertures 80 equally radially spaced thereabout. The outer diameter of base 66 is approximately equal to the diameter of the annular outer surface 24 of adapter ring 20.

Slide ring 62 is attached to adapter ring 20, as is best seen in FIGS. 1, 2 and 5, with gasket 50 disposed therebetween. When mounted, the base of slide ring 62 is positioned against base 52 of gasket 50. Apertures 80 align with apertures 58 in gasket 50 and mounting bores 36 in adapter ring 20.

Centering screws 82, best seen in FIGS. 2, 3 and 5, are provided and pass through flat washers 83, apertures 80, apertures 58 and are threadingly received in mounting bores 36, thereby fastening slide ring 62 to adapter ring 20 with diaphragm 50 disposed therebetween. Centering screws 82 can be loosened or tightened in mounting bores 36 thereby moving in a linear direction parallel to axis A. When centering screws 82 are moved, slide ring 62 moves in response, as will be discussed in more detail below.

Friction ring 90, best seen in FIGS. 2, 3, 4, 5, 6, 14 and 15, is generally a series of integral, coaxial, hollow cylinders 101, 103, 105, 110 and 111. Cylinder 103 has a cylindrical outer surface 92 and a corresponding cylindrical inner surface 94 defining a cylindrical cavity 96 through which the shaft 12 passes. Cylinder 101 is located at an end 98 of friction ring 90, best seen in FIGS. 5 and 15, and includes an annular channel 100. Channel 100 has a smooth, annular surface which is generally concentric with surfaces 92 and 94. A lip 104 is annular and extends outward from channel 100, lip 104 forming one end of friction ring 90. A wall portion 106 connects channel 100 with outer surface 92. Channel 100 provides a mounting location for foot 56 of gasket 50. Foot 56 is attached to channel 100 by an O-ring 108, as seen in FIGS. 2, 3 and 5, creating a watertight seal between gasket 50 and friction ring 90.

Cylinder 110, best seen in FIGS. 2, 4, 15 and 16, includes an interior annular wall 112 defining an internal cylindrical cavity 114 through which shaft 12 passes and which aligns with and communicates with cavity 96. Cavity 114 has a diameter larger, preferably ¼" or more larger, than the diameter of shaft 12. Sealing portion 116 is formed on the forward-facing side of cylinder 110. Cylinder 110 has an outside diameter slightly smaller than that of the annular outer surface 24 of the adapter ring 20. Cylinder 110 includes a bore 122 for attachment of a hose barb 124, shown in FIGS. 1, 2, 3 and 5. Hose barb 124 is connectable to a hose for an air vent (not shown) or a water supply (not shown).

A sealing surface 126 is generally flat and annular and is formed on the forward-facing side of sealing portion 116. Cylinder 105 has an outer annular surface 132 which has an outside diameter smaller than the outside diameter of cylinder 110 and greater than the diameter of wall 92 of cylinder 103. Cylinder 105 has a rearwardly disposed radial retention surface 128. Retention surface 128 is generally flat and annular and perpendicular to surface 92 of cylinder 103.

A biasing or loading means shown as a seal tension spring 130, best seen in FIGS. 2, 3, 4, 5 and 16, is a helical spring preferably formed of stainless steel or a non-metallic, or a noncorrosive material, or a material with a noncorrosive component. Spring 130 surrounds outer cylinder 103 and is retained between retention surface 128 at one end and by a support surface 78 of slide ring 62 at the other end.

A spring cover 134, best seen in FIGS. 1, 2, 3, 4, 5, and 17, has two end portions 136 and a center bellows portion 138. Spring cover 134 is hollow, flexible and surrounds spring 130. Cover 134 can advantageously be a urethane product. An end portion 136 of cover 134 mounts over outer annular surface 132 of cylinder 110 and butts against cylinder 105 and is fastened to the outside edge of cylinder 105 by a fastener, which is preferably a pair of O-rings 108, creating a watertight seal. The other end 136 of spring cover 134 is fastened to the outer surface 68 of slide ring 62 by a pair of O-rings 108, creating a watertight seal.

Means are required for allowing passage of the propeller shaft through the vessel hull to the water-seal system. In FIGS. 1 and 2, a thru-hull adapter 142 is attached to the second end 32 of adapter ring 20. Referring to FIGS. 2, 18 and 19, thru-hull adapter ring 142 has a connecting end, such as a threaded, tubular end 144, which is threadingly received in section 42 of receiving portion 40 of adapter ring 20, and an adapter end or flange 146 which adapts device 10 to a specific vessel hull configuration. Tubular end 144 has a bore with a diameter for receiving propeller shaft 12. Bores for receiving shafts having ODs of ¾ to 12" have been used, although the invention is not limited to that range of sizes. Adapter flange 146 has a set of radially disposed, longitudinal recesses 147 for receiving a tool for turning adapter ring 142 to tighten flange 146 against the vessel hull. It will be appreciated that adapter end 146 of component 142 can have any configuration and ring 142 will be chosen so that it has an adapter end 146 capable of adapting device 10 to the specific vessel hull/aperture configuration desired.

Figure 22:
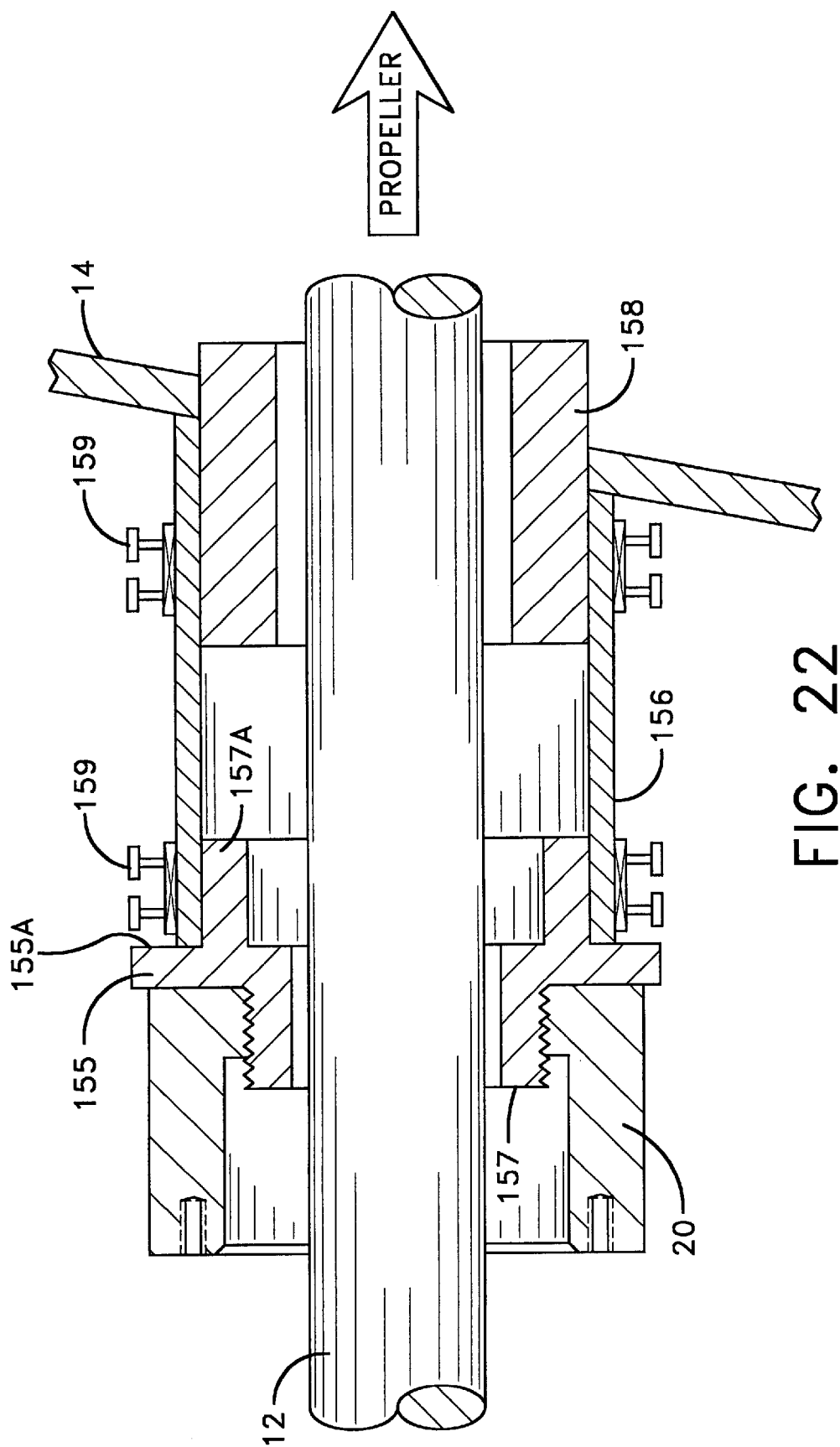
FIG. 22 is a side view of a hose adapter for connecting a stern tube to an adapter ring pursuant to the present invention.

Other components for leading a propeller shaft through the hull or bulkhead of a vessel are shown in FIGS. 20, 21 and 22.

FIGS. 20 and 21 show an adapter flange 148 having a threaded, tubular end 149. A flange 150 has apertures 151 which align with apertures in a plate in the vessel's hull. Standard fasteners (not shown) attach the adapter flange to the plate, and the propeller shaft extends through the tube and into the water-sealing apparatus.

In FIG. 22, an adapter ring 20 is mounted for receiving the propeller shaft. A hose adapter 155 has its threaded forward portion 157 screwed into adapter ring 20. The rearward end of hose ring 155 extends to hull 14. A stern tube 158 is attached to hose adapter 155 at rearwardly extending portion 157A by an elastomeric hose 156, such as a rubber hose. A radial wall or shoulder 155A limits the amount hose 156 can be placed on portion 157A. Hose clamps 159 attach hose 156 between hose adapter 155, adapter ring 20 and stern tube 158.

Turning now to the operation of sealing device 10, device 10 is inserted onto the propeller drive shaft, as is best seen in FIGS. 1 and 2, with the friction ring 90 and its sealing portion 116 facing the engine of the vessel, and the adapter ring 20 being adjacent the hull of the vessel. The device 10 is attached to the hull by means of the thru-hull adapter ring 142, adapter flange 148, or hose adapter 155 and stern tube 158, each of which extends from the exterior of the hull, through the hull, or from an opening on the interior side of the hull, and is connected to adapter ring 20 such as by the threading engagement of the screw threads of the adapter ring and the thru-hull adapter ring or the like. The thru-hull adapter, flange adapter, or the hose adapter and stern tube or others are specifically selected for the hull/aperture configuration of the vessel.

The propeller drive shaft 12 has a shaft clamp 163 fixedly mounted to it. Seal ring 161 is attached to shaft clamp 163 by longitudinally extending connection screws 165. Seal ring 161 has a flat, rearwardly-facing seal surface 160. A shaft clamp 163 is mounted against seal ring 161 and fastened to seal ring 161 by compression screws 165. Shaft clamp 163 holds seal ring 161 in position so that its seal surface engages flat radial seal surface 126 of friction ring 110. Clamp 163 is held fast on the shaft by clamp screw 167, which forces the free ends of clamp 163 towards each other. An O-ring 169 is clamped between clamp 163 and seal ring 161 to stop water from leaking between the seal ring 161 and shaft 12. A safety shield 170 is attached to friction ring 50 by self-tapping screws 172 or other fastener devices, and extends forwardly.

Once device 10 is mounted it should be adjusted to align axis A of the device with the axis of shaft 12. This is accomplished by loosening and/or tightening the respective centering screws 82. When each respective screw is tightened into the bore 36 into which it is threadingly received, it draws the portion of base 66 proximate the bore 36 closer to gasket 50 and adapter ring 20. This skews base 66, slide ring 62, friction ring 90 and friction ring 110 thereby altering their linear alignment. Similarly, when a respective screw 82 is loosened it pushes against the threads in the bore 36 into which it is received and moves the portion of base 66 proximate to the respective bore 36 away from gasket 50 and adapter ring 20. This skews base 66, slide ring 62, friction ring 90 and friction ring 110 in the opposite direction, thereby altering their linear alignment. The friction ring 90 and slide ring 62 can thereby he aligned with axis A of shaft 12 by appropriate loosening and/or tightening the respective screws 82. Preferably, friction ring 90 and slide ring 62 will be aligned so that shaft 12 is centered in the cavity 114 of the friction ring.

Figure 4:
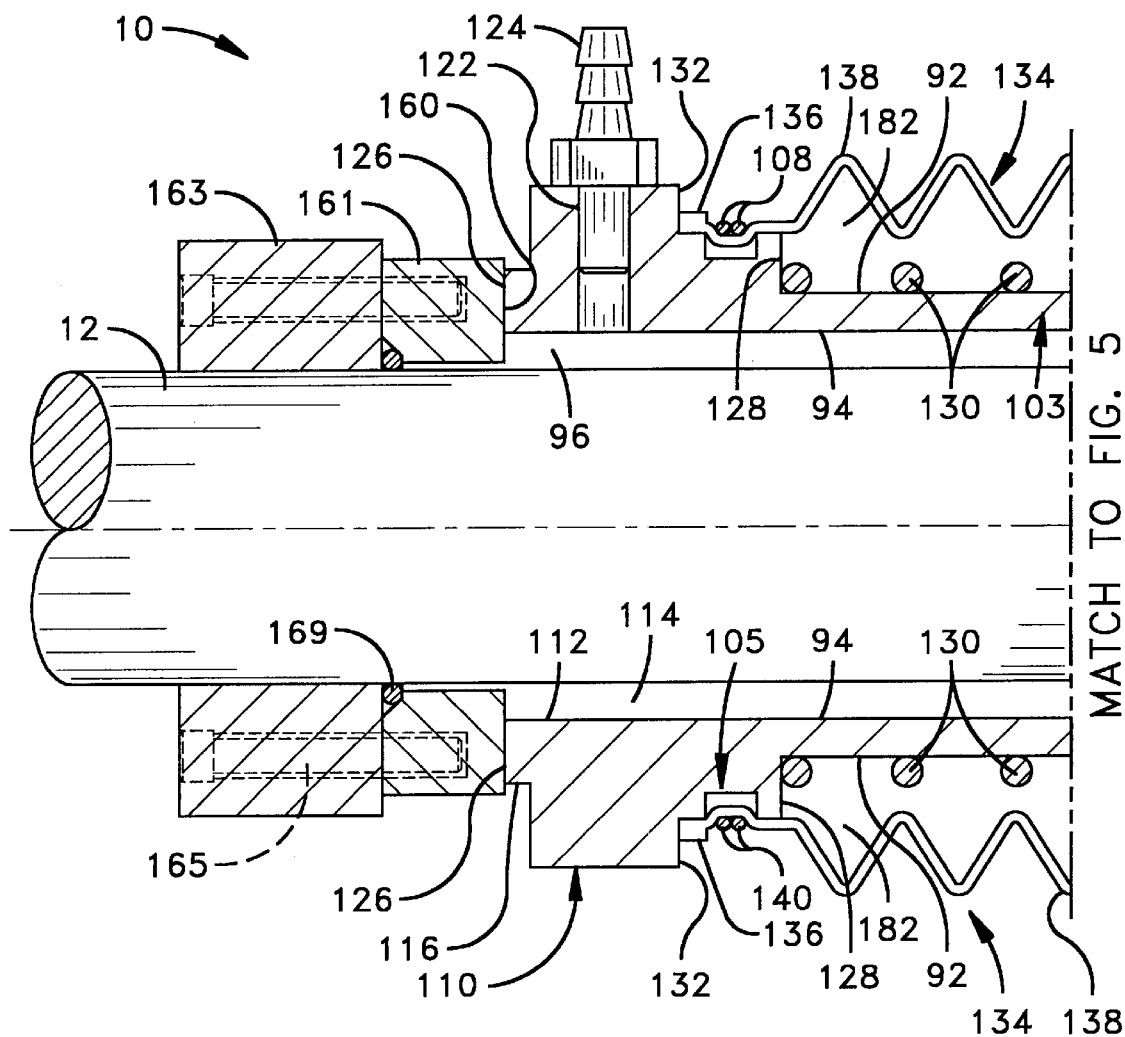
FIG. 4 is a partial, enlarged view showing the front portion of the device shown in FIG. 2.

During the operation of the engine, propeller shaft 12 rotates and seal ring 161, shaft clamp 163 and O-ring 169 rotate with the shaft. Device 10 is stationary because the cylindrical cavity 114 aligned along axis A defined by the above-described components of the device is larger than the outside diameter of the propeller shaft and the shaft is allowed to rotate freely. Seal ring 161 contacts and rides against stationary sealing surface 126 forming a watertight surface or face seal, as seen in FIGS. 2 and 4. Spring 130 biases or loads friction ring 90 and surface 126 towards ring 161 and creates enough pressure between surface 126 and ring 161 to maintain a watertight seal.

Water (W) entering through the gap between the propeller drive shaft and the hull of the vessel passes into the inner cavity 14 of device 10. Much of the water is channeled past outer lip 104 into a cavity 180 defined between leg 54 and foot 56 of gasket 50 and cylindrical inner surface 26 of adapter ring 20. This water is blocked by leg 54 of diaphragm 50. In the event diaphragm 50 should fail, the water would pass between outer surface 92 of cylinder 103 of friction ring 90 and inner surface 70 of slide ring 62 into a cavity 182 defined between surface 92 and spring cover 130. In such a case, spring cover 130 would provide a backup seal and keep the water from entering the inside of the vessel.

Water entering the narrow channel defined between the shaft 12 and the interior surface 94 of cylinder 103 is blocked by the surface or face seal formed between sealing surfaces 126 of friction ring 90, seal ring 161 and by O-ring 169.

When the vessel is operating, the forward or rearward thrust of the propeller causes the propeller shaft 12 to move, either forwards, towards the engine, or aft, towards the propeller, along axis A. When the vessel is driven forward, propeller shaft 12 is pushed along axis A towards the engine. This moves the seal ring 161 away from surface 126. Spring 130 has enough compressive force to move friction ring 90 and, hence, surface 126 towards seal ring 161 in order to maintain contact between surfaces 126 and seal ring 161 with enough pressure between them to form a watertight seal. In this situation, as friction ring 90 is biased towards the engine, the bellows portion 138 of spring cover 134 unfolds and expands. Indented end 98 of friction ring 90 moves linearly along axis A towards the engine, thus moving foot 56 of gasket 50 in response. Fasteners 108 maintain a watertight seal between foot 56 and channel 100 during this movement.

Figure 6:
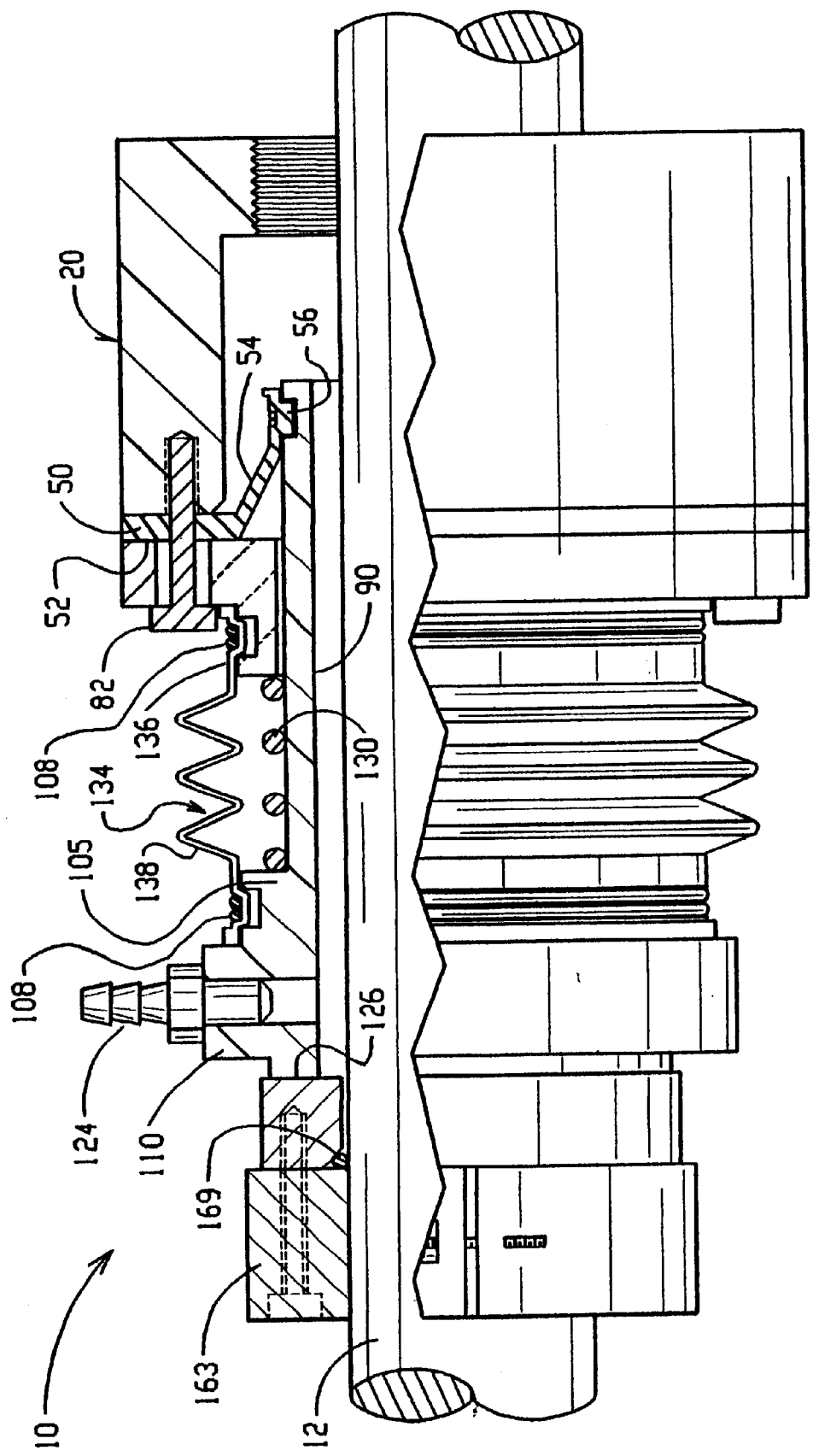
FIG. 6 is a partial longitudinal section view, in partial cross section, showing the device dented in FIG. 1 in a compressed position.

When the vessel is driven backward, propeller shaft 12 is pulled along axis A towards the propeller, as is best seen in FIG. 6. This moves the seal ring 161 towards surface 126, applying force pressure to friction ring 110 and compressing spring 130. Spring 130 is flexible and compresses to allow the friction ring 90 to move towards the propeller in response to the force exerted on surface 126 by ring 161. Importantly, spring 130 is flexible enough so that the pressure between surface 126 and ring 161 remains relatively constant and does not increase to the point where the rotation of ring 161 will score or otherwise damage surface 126.

When spring 130 compresses, the bellows portion 138 of spring cover 134 collapses and indented portion 98 of cylinder 103 is pushed towards the propeller. Foot 56 of gasket 50 is fastened to channel 100 by O-ring 108 and is pulled toward the propeller in response to the movement of cylinder 103. Leg 54 is thereby stretched and is supported by angled recess 38, angled recess 38 being formed so as not to have a sharp edge which may cut or damage leg 54.

Having described the preferred embodiment, alternative embodiments will now be described. Components similar to those in the preferred embodiment will be given like designations and particular emphasis will be placed on different components and structure.

Figure 23:
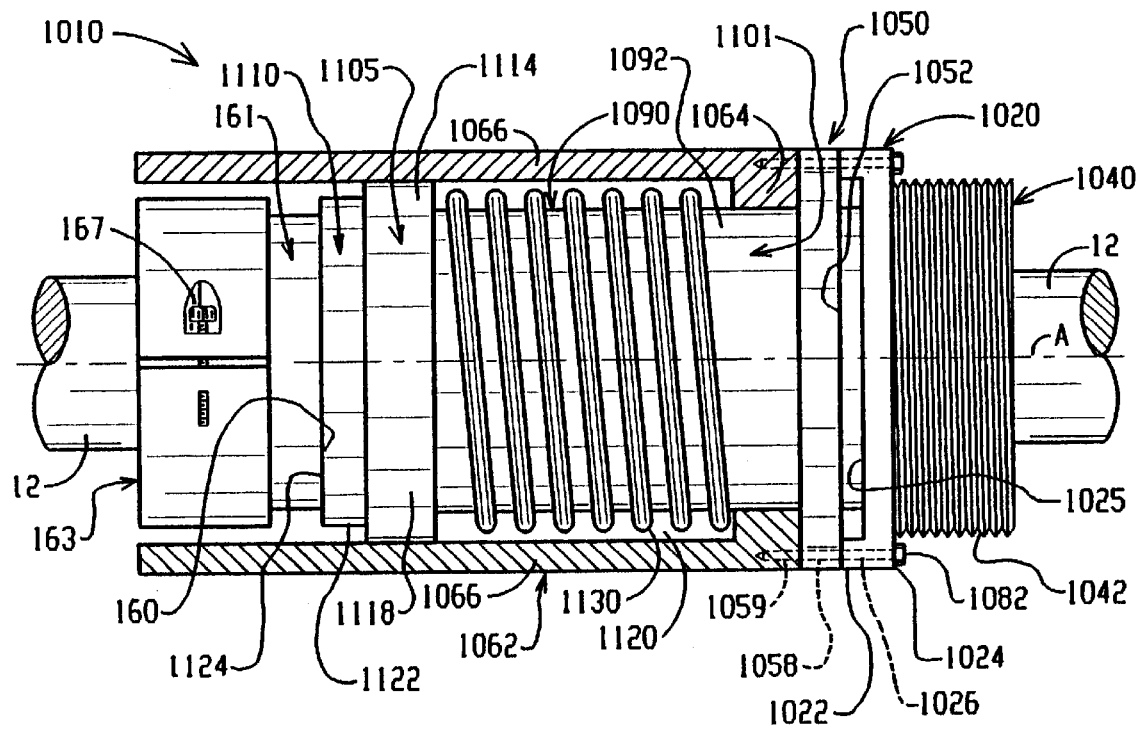
FIG. 23 is a side view of a second embodiment of the present invention mounted on a propeller drive shaft.

FIG. 23 shows an alternative embodiment 1010 specifically designed to support the friction ring to insure that it is aligned with axis A of shaft 12. An adapter ring 1020 is a short, hollow cylindrical tube having an annular wall 1022 and a cylindrical inner cavity through which shaft 12 passes. A flat, radial surface 1024 is formed along one side and is perpendicular to wall 1022, and an opposing flat radial surface 1025. An elongated receiving portion 1040 defines a cylindrical interior cavity (not shown) through which shaft 12 extends and has a threaded, annular exterior wall 1042 which receives adapter components (not shown), such as a thru-hull adapter ring discussed earlier. A plurality of radially spaced bores 1026 are formed in surface 1024 parallel to axis A. Bores 1026 extend through wall 1022.

A flat gasket or diaphragm 1050 contains spaced apertures 1058 formed to align with bores 1026. Gasket 1050 includes a radial face 1052 mounted on annular ring 1020, as shown in FIG. 23. A set of bores 1058 are in alignment with bores 1026.

A slide ring 1062 includes a base 1064 and an outer cylinder 1066 extending from base 1064 in a direction generally parallel to axis A. Base 1064 is mounted on gasket 1050, compressing gasket 1050 between base 1064 and adapter ring 1020. Cylinder 1066 extends longitudinally towards the engine and terminates at an open end disposed radially outwardly from shaft clamp 163.

Fasteners 1082, which are preferably centering screws, pass through bores 1026 and apertures 1058 and are threadingly received in bores 1059 in slide ring 1062, thereby fastening slide ring 1062 to adapter ring 1020 with gasket 1050 interposed therebetween.

A friction ring 1090 is composed of a set of three integral hollow, peripherally oil-impregnated plastic or other material cylinders 1101, 1105 and 1110. Cylinder 1101 has a cylindrical outer surface 1092 and defining a cavity through which the shaft 12 passes. One end of friction ring 1090 is received in the inner cavity of adapter ring 1020 where it contacts face 1025 of adapter ring 1020 and the periphery of surface 1064 of slide ring 1062.

Cylinder 1105 is a guide ring and a sealing portion. Cylinder 1105 has an outer annular surface 1118 which has a diameter greater than the diameter of cylinder 1101 and a spring compression surface 1120, which is generally flat and radial and extends about the periphery of cylindrical outer surface 1092. Cylinder 1110 is a sealing portion having an annular outer surface 1122, which has a diameter less than the diameter of outer annular surface 1118 of guide ring 1105, and a seal face 1124 which is generally flat and radial.

A loading or biasing means 1130, which in the preferred embodiment is a stainless steel coil spring, is provided oil cylinder 1101 and is retained and compressed between base 1064 and spring retention surface 1120 of guide ring 1105.

Outer surface 1118 of guide ring 1105 has a diameter approximately equal to the inner diameter of cylinder 1066.

Guide ring 1114 is thereby contained within and supported by cylinder 1066. Cylinder 1066 guides the guide ring 1114 along the longitudinal axis of cylinder 1066. The friction ring 1090 can thereby be accurately aligned in order to maintain a seal between surface 1124 and the seal surface of seal ring 161.

Turning now to the operation of sealing device 1010, device 1010 is inserted onto the propeller drive shaft with the friction ring 1090 facing the engine of the vessel, and the adapter ring 1020 being adjacent the hull of the vessel. Device 1010 is attached to the hull by means of a thru-hull adapter ring or the like, which is specifically designed for the hull/aperture configuration of the vessel and extends through an opening in the hull, and is threadingly received on receiving portion 1040 of adapter ring 1020.

Once device 1010 is mounted it should be adjusted to align its axis A with the axis of shaft 12. This is accomplished by loosening and/or tightening the respective centering screws 1082. When each respective screw is tightened into the bore 1068 into which it is threadingly received, it draws the portion of base 1064 proximate the bore 1058 closer to gasket 50 and adapter ring 1020. This skews base 1064 and friction ring 1090, thereby altering their linear alignment. Similarly, when a respective screw 1082 is loosened it pushes against the threads in the bore 1058 into which it is received and moves the portion of base 1064 proximate to the respective bore 1058 away from gasket 1050 and adapter ring 1020. This skews base 1064 and friction ring 1090 in the opposite direction, thereby altering their linear alignment. The friction ring 1110, friction ring 1090 and base 1064 can thereby be aligned with axis A of shaft 12 by loosening and/or tightening the respective screws 1082. Preferably, friction ring 1090 can be aligned so that shaft 12 is centered in the opening in the friction ring.

A shaft clamp or collar 163 is mounted tightly on shaft 12 by screws 167 and is connected to seal ring 161 by longitudinally connecting screws or the like, holding it in a fixed position so that its seal surface 160 is held against flat radial seal face 1124 of friction ring 1090. An O-ring (not shown, but as discussed earlier with respect to O-ring 169) is clamped between clamp 167 and seal ring 161 to stop water from leaking between the seal ring 161 and shaft 12.

During the operation of the engine, propeller shaft 12 rotates and seal ring 161, clamp 167 and the O-ring rotate with the shaft. Device 1010 is stationary because the cylindrical cavity extending through the device is larger than the diameter of the propeller shaft; therefore, the shaft extending through the stationary hull is allowed to rotate freely. The seal surface 160 of seal ring 161 contacts and rides against stationary sealing surface 1124 forming a watertight surface or face seal. Spring 1130 biases or loads friction ring 1110 and surface 1124 towards ring 161 and creates enough pressure between surface 1124 and ring 161 to maintain a watertight seal.

When the vessel is operating, the forward or rearward thrust of the propeller causes the propeller shaft 12 to move, either forwards, towards the engine, or aft, towards the propeller, along axis A. When the vessel is driven forward, propeller shaft 12 is pushed along axis A towards the engine. This moves the seal ring 161 away from surface 1124. Spring 1130 has enough compressive force to move friction ring 1090 and surface 1124 towards seal ring 161 in order to maintain contact with enough pressure between surface 1124 and ring 161 to form a watertight seal.

When the vessel is driven backward, propeller shaft 12 is pulled along axis A towards the propeller. This moves the seal ring 161 towards surface 1124 applying pressure to friction ring 1110 and compressing spring 1130. Spring 1130 is flexible and compresses to allow the friction ring 90 to move towards the propeller in response to the force exerted on surface 1124 by ring 161. Importantly, spring 1130 is flexible enough so that the pressure between surfaces 1124 and ring 161 remains relatively constant and does not increase to the point where the rotation of ring 161 will score or otherwise damage surface 1106.

Figure 24:
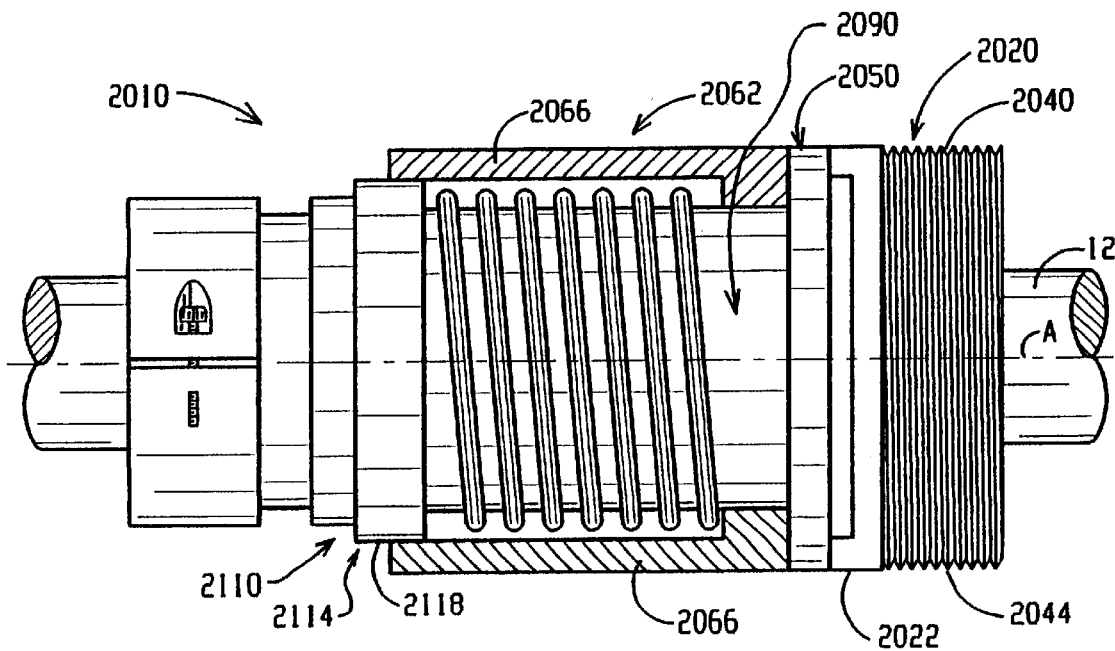
FIG. 24 is a side view of a third embodiment of the present invention mounted on a propeller drive shaft.

Turning now to FIG. 24, a third embodiment 2010 of the present invention is shown installed on a propeller drive shaft 12. Device 2010 is similar in design to device 1010 shown in FIG. 23. Therefore, identical structures and components will not be identified in a great detail here, it being understood that they were described in the description of device 1010. Particular emphasis will be placed on the different features in device 2010. As with device 1010, device 2010 is specifically designed to support the friction ring 2090 and insure that it is aligned with the axis of shaft 12. Adapter ring 2020 is a short, hollow cylindrical tube having a smooth, annular, outer wall 2022 and an elongated receiving portion 2040 having a threaded annular outer wall 2044. The diameter of walls 2022 and 2044 are approximately equal, receiving portion 2040 being designed to threadingly receive an adapter component 142 or the like, as is described in greater detail above. An interior cavity (not shown) is defined through adapter ring 1020, and shaft 12 passes therethrough. Sea gasket 2050 is in all respects the same as sea gasket 1050 and will not be described in detail here. Slide ring 2062 is identical to slide ring 1062 except that cylinder 2066 is shorter than cylinder 1066. Cylinder 2066 extend in a direction generally parallel to axis A to a point approximately half way across an annular outer surface 2118 of a guide ring 2114. Furthermore, there are no adjustable attachment means, such as centering screws, attaching slide ring 2062 to adapter ring 2020. Slide ring 2062 is instead fixedly attached to housing 2020.

Figure 25:
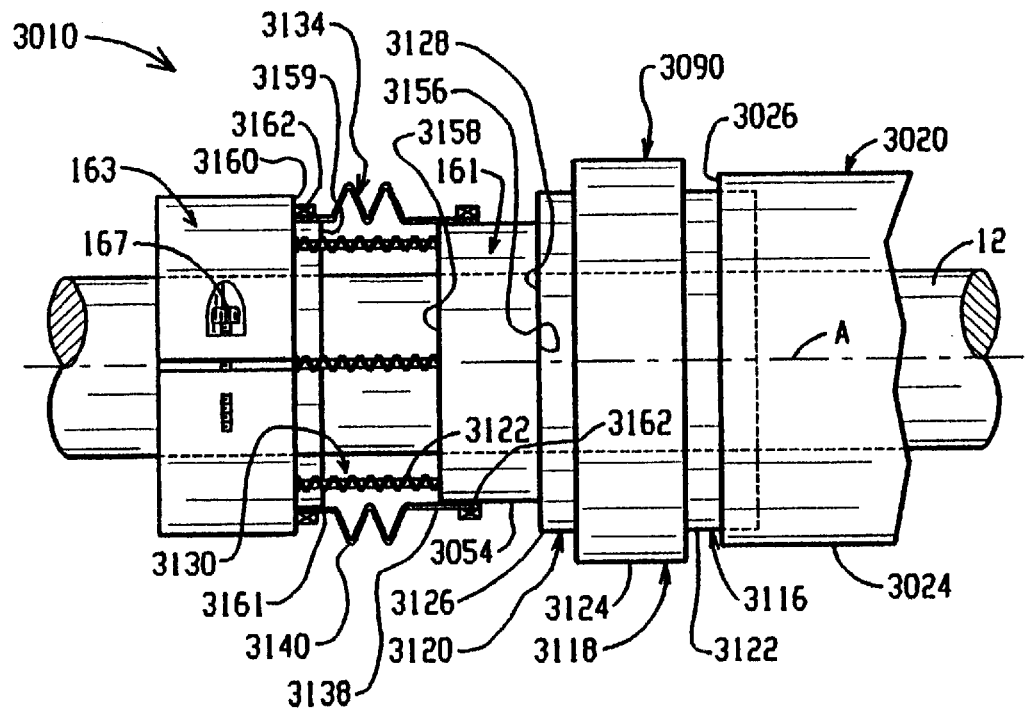
FIG. 25 is a side view of a fourth embodiment of the present invention mounted on a propeller drive shaft.

Turning now to FIG. 25, a fourth embodiment 3010 of the present invention is shown mounted onto a rotating shaft 12, such as a propeller drive shaft. Sealing device 3010 defines a generally cylindrical bore (not shown) therethrough, through which shaft 12 passes. As will be described below, device 3010 is specifically designed for shafts having extreme eccentric movement or wobble. Sealing device 3010 is comprised of a hose 3020, a friction ring 3090, a seal ring 161, a biasing or loading means 3130 and a shaft clamp 163.

Hose 3020 is basically a cylindrical hose having a cylindrical outer wall 3024 and a cylindrical inner cavity through which shaft 12 passes. Hose 3020 is flexible and resilient and is preferably made of rubber or plastic and rubber. One end (not shown) of hose 3020 is fitted over the interior end of a stern tube (not shown) and the other end 3026 is fitted over a portion of friction ring 3090 as will be discussed below.

Friction ring 3090 is comprised of three integrally formed, generally cylindrical components, a support section 3116, a center portion 3118 and a sealing section 3120. Support section 3116 is generally a hollow cylinder having an external cylindrical surface 3122. End 3026 of hose 3020 is mounted over cylindrical surface 3122 and is preferably secured by a hose clamp (not shown).

Center portion 3118 is formed adjacent support section 3116 and has an outer annular surface 3124 and an inner cylindrical cavity through which shaft 12 passes and in which shaft 12 rotates. Surface 3124 has a diameter greater than the diameter of surface 3122.

Sealing section 3120 is formed adjacent center portion 3118 opposite support section 3116. Sealing section 3120 has an outer annular surface 3126, a generally flat radial sealing face 3128, and an inner cavity (not shown) for receiving shaft 12.

The respective inner cavities of support section 3116, center portion 3118 and sealing section 3120 align to form one continuous cylindrical cavity through friction ring 3090, through which shaft 12 passes.

Seal ring 161, which is preferably formed of stainless steel, is provided on shaft 12 adjacent sealing section 3120. Seal ring 161 is circular and has an annular outer surface 3054 and an annular inner surface within which shaft 12 is located when device 3010 is mounted for operation. Sealing surface 160 which is generally flat and radial and extends between outer surface 3054 and the inner annular surface defining the bore for shaft 20. Sealing surface 160 is parallel to and sealingly engages sealing face 3128 of friction ring 3090.

A shaft clamp or collar 163 is cylindrical and tightly fitted onto shaft 12 by means of a clamping screw 167. Shaft clamp 163 has a side 3160 formed along a side facing seal ring 161. An inner annular surface of side 3160 of collar 163 is contained on side 3160 for defining the entrance to the bore for receiving shaft 20.

Biasing or loading means 3130, which are preferably a set of stainless steel springs 3132, are connected at one end to the inner surface of side 3160 of shaft clamp 163 and connected at the other end to the surface 3158 of seal ring 161. In this respect, side 3160 of collar 163 contains four radially-spaced bores which receive the ends of springs 3122 and surfaces 3158 of seal ring 161 contains four radially-spaced bores (not shown) in registry with the bores in side 3160, which receive the other ends of springs 3122. In a preferred embodiment, there are four or more equally radially-spaced biasing means forming biasing means 3130. A biasing means cover 3134 is a generally tubular, flexible member having ends 3138 and a center 3140. One end fits over a recessed end 3159 of side 3160 and is clamped in place by a hose clamp 3162. The other end 3138 fits over outer annular surface 3054 of seal ring 161 and is clamped in place by a hose clamp 3162. Center 3140 is generally of a bellows construction, allowing for the compression and extension of cover 3134 as discussed earlier with respect to the forward and rearward shifting of seal ring 161.

Figure 26:
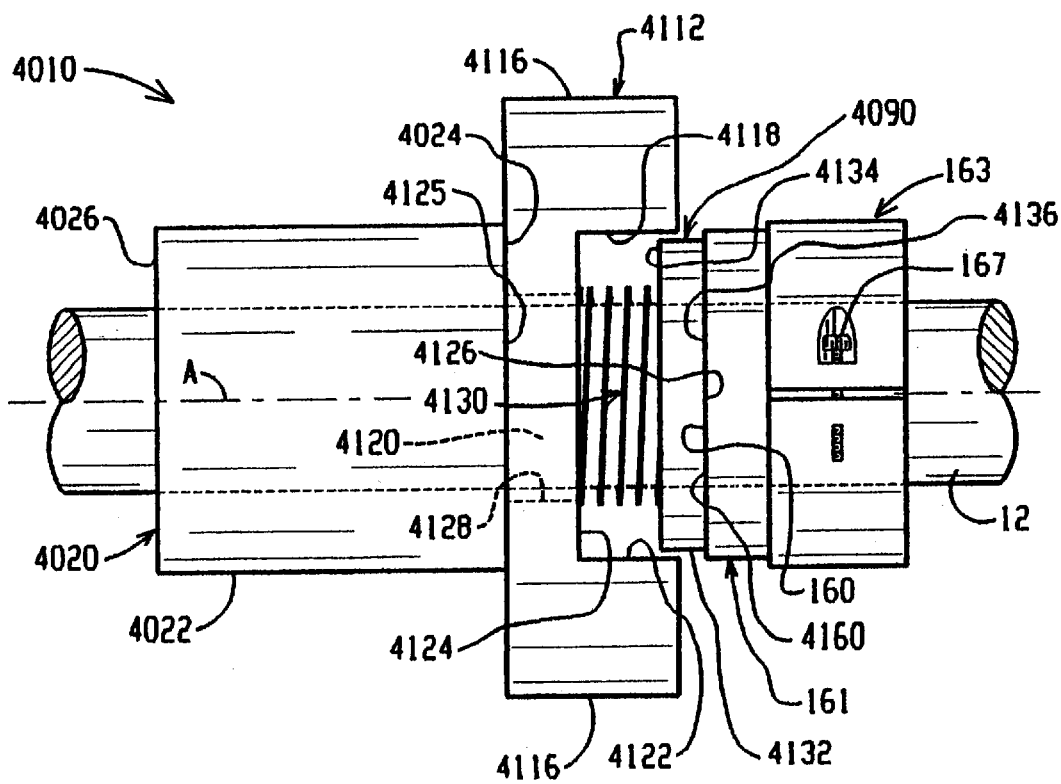
FIG. 26 is a side view of a fifth embodiment of the present invention mounted on a propeller drive shaft.

Turning now to FIG. 26, a fifth embodiment 4010 of the present invention is shown mounted around shift 12. Device 4010 basically comprises an adapter ring 4020, a friction ring 4090, a biasing means 4130, a seal ring 161 and a shaft clamp 163. Adapter ring 4020 is generally a hollow, cylindrical tube having an outer, annular surface 4022 and an inner cavity for receiving shaft 12. A first end 4024 includes a radial, flat mating surfaces. A second end 4026 includes attachment means for attachment to thru-hull adapter ring 142 or the like, as described in detail above.

A base member 4112 is generally a hollow, cylindrical member having an outer, annular surface 4116, a first bore 4118 and a second bore 4120. Bore 4118 extends approximately half way into friction ring, 4090 along axis A and has annular surface 4122 and a support surface 4124 which is generally flat and annular. Second bore 4120 is cylindrical and oriented about axis A and extends from first bore 4118 through the end 4126 of friction ring 4090 adjacent adapter ring 4020. Second bore 4120 is, therefore, in communication with the inner bore of adapter ring 4020 and has an annular wall 4128 for receiving shaft 12.

Friction ring 4090 is generally a cylindrical ring having an annular outer surface 4132 and an annular inner surface which defines a cylindrical bore, the bore having a diameter larger than the diameter than the diameter of shaft 12. Friction ring 4090 has a first end 4134 which includes a generally flat, surface between the inner annular surface and outer annular surface 4132. A second end 4136 includes a flat sealing surface 4160 extending between the inner annular surface and the outer annular surface 4132.

Biasing means 4130 is generally comprised of a cylindrical stainless steel spring surrounding shaft 12. One end of spring 4130 engages surface 4124 of base 4112 and the other end of spring 4130 engages surface 4134 of friction ring 4090.

A seal ring 161 is provided on shaft 12 and is preferably formed of stainless steel. Ring 161 is generally cylindrical and has a flat radial sealing surface 160 which mates with and sealingly engages the sealing surface 4126 of friction ring 4090 on second end 4136. A shaft clamp 163 is provided on shaft 12 adjacent to and connected to seal ring 161. A clamping screw 167 is used to tighten clamp 163 to shaft 12 thereby holding seal ring 161 in a fixed position on shaft 12. The axial adjustment of the apparatus described in FIG. 26 is the shaft drives the ship fore and aft is as discussed earlier.

Figure 27:
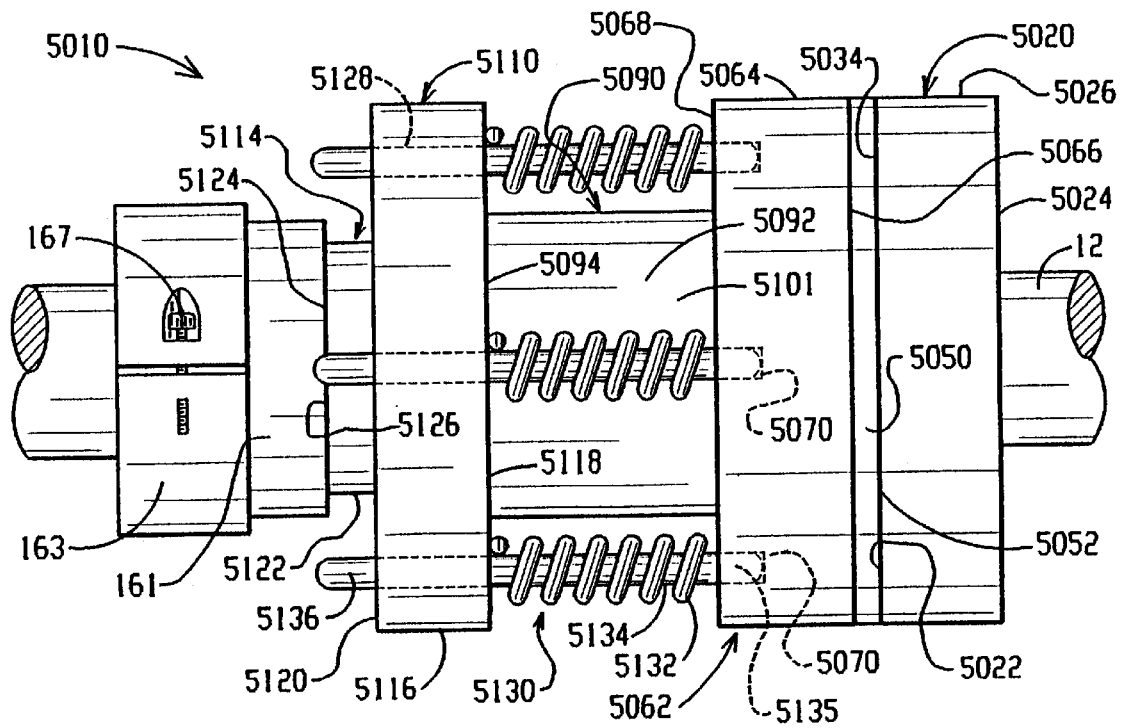
FIG. 27 is a side view of a sixth embodiment of the present invention mounted on a propeller drive shaft.

Turning now to FIG. 27, a sixth embodiment 5010 of the present invention is shown installed on propeller drive shaft 12. Device 5010 has an adapter ring 5020 which is a short, hollow, cylindrical tube having a first end 5022 and a second end 5024. Second end 5024 contains an attachment means for the thru-hull adapter ring 142, as described in detail above, or to some other means for connecting the seal assembly to the hull or bulkhead. Adapter ring 5020 has a cylindrical exterior wall 5026 and an interior cavity through which shaft 12 passes.

Gasket or diaphragm 5050 includes an annular base, a leg and an annular foot similar to those of gasket 50 and best seen in FIGS. 2, 3, 9, 10 and 11. Base 5052 is mounted on surface 5034 of adapter ring 5020.

Slide ring 5062 has an exterior cylindrical surface 5064 and an inner cavity which communicates with the inner cavity in adapter ring 5020 for receiving shaft 12. Slide ring 5062 has a first end 5066 including a generally flat, radial surface which compresses gasket 5050. A second end 5068 of slide ring 5062 includes a generally flat, radial surface. Cylindrical bores 5070 are equally radially spaced about the annular surface of side 5068.

Friction ring 5090 has generally an elongated, hollow, cylindrical cylinder 5101 having a cylindrical surface 5092 and an interior cavity through which shaft 12 passes. A first end of friction ring 5090 is contained within the cavity formed by slide ring 5062 and adapter ring 5020 seals against water with gasket 5050. A second end 5094 of cylinder 5101 is attached to or integrally formed with a second hollow cylinder 5110 discussed below of friction ring 5090.

Friction ring 5090 includes two additional integrally formed, generally concentric hollow cylinder 5110 and friction ring seal member 5114. Cylinder 5110 has an outer annular surface 5116, a first side 5118 and an second side 5120. Sides 5118 and 5120 are generally radial and flat and are on opposite sides of cylinder 5110. Friction ring seal member 5114 is formed adjacent cylinder 5110, and on the opposite side of cylinder 5110 from cylinder 5101. Friction ring seal member 5114 includes an annular outer surface 5122 and has a first end 5124 which includes a generally flat, radial sealing surface 5126. Sealing surface 5126 engages seal surface 160 of seal ring 161. A plurality of bores 5128 extend through cylinder 5110, bores 5128 being in registry with bores 5070 in slide ring 5062.

Biasing or loading means 5130, each of which is preferably a stainless steel spring 5132 inserted onto posts 5134, wherein posts 5134 are preferably made of steel. Posts 5134 are elongated steel bars and each has a first end 5135 and a second end 5136. The respective first ends 5135 of posts 5134 are inserted into bores 5070 in surface 5068 of slide ring 5062. The second ends 5136 of posts 5134 are inserted into bores 5128 of cylinder 5110, and extend through cylinder 5110. In a preferred embodiment there are four posts 5134 each having springs 5132, equally radially spaced about cylinder 5101. Springs 5132 are retained by surface 5068 at one end and by surface 5118 at the other end. The adjustment of apparatus 5010 as shaft 12 moves the vessel fore and aft is as described earlier.

Figure 28:
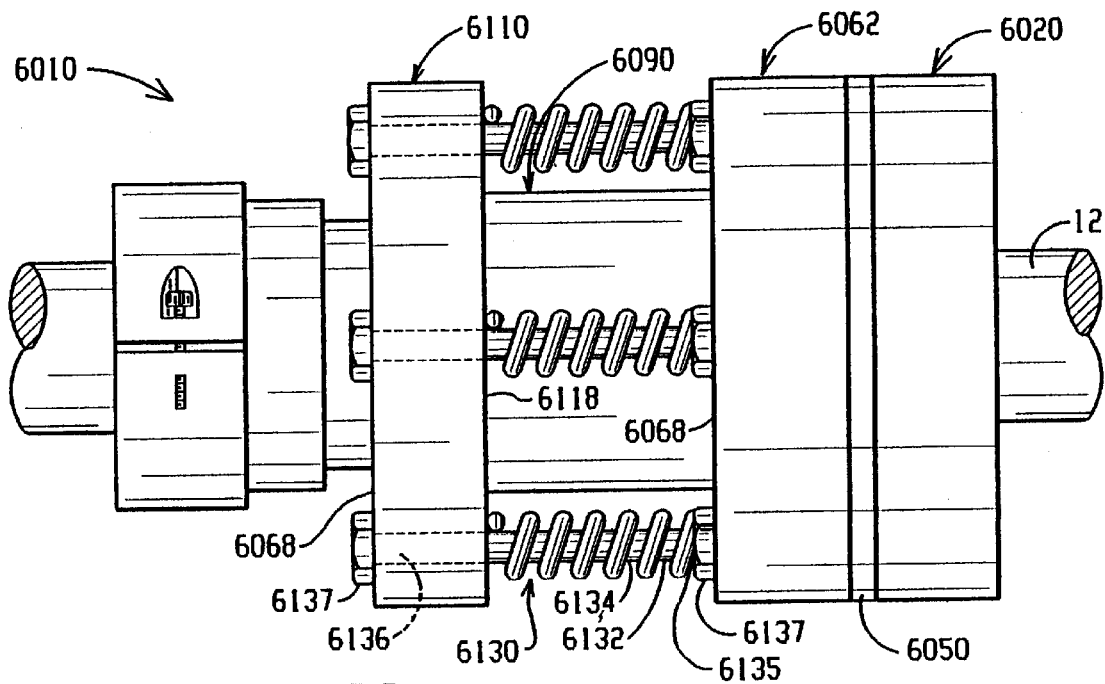
FIG. 28 is a side view of a seventh embodiment of the present invention mounted on a propeller drive shaft.

Turning now to FIG. 28, a seventh embodiment 6010 of the present invention is shown installed on a propeller drive shaft 12. Device 6010 is identical in all respects to device 5010, which is described in detail above, except for the biasing or loading means 6130. Thus, device 6010 includes an adapter ring 6020, a diaphragm 6050, a slide ring 6062, and friction ring 6090. Biasing or loading means 6130, similar to biasing means 5130, are comprised of posts 6134, which are preferably stainless steel shafts. Posts 6134 have ends 6135 and ends 6136. Both ends 6135 and 6136 are threaded so as to be threadingly received in respective nuts 6137. Nuts 6137 are fastened to the surface 6068 of slide ring 6062 and to surface 6120 of ring 6110.

Figure 29:
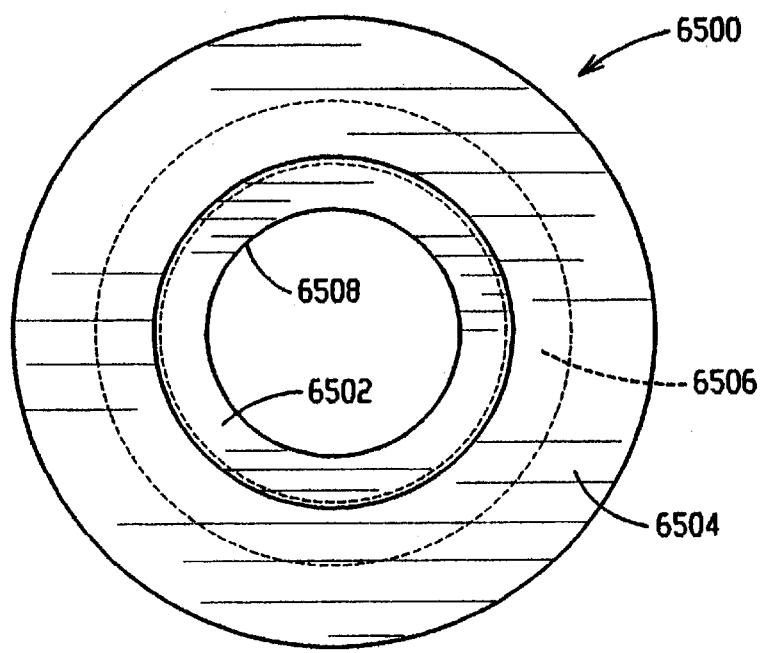
FIGS. 29 and 30 are front and side views of a hose adapter according to the invention.
Figure 30:
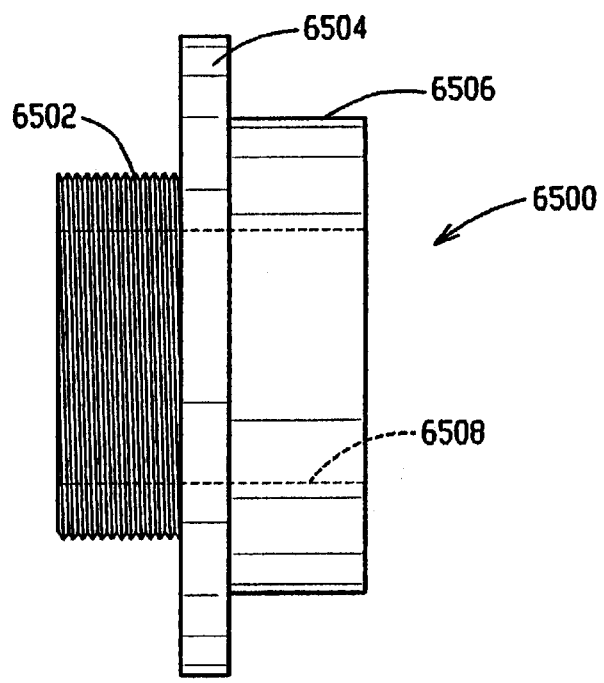

A hose adapter is another embodiment of the invention. Turning to FIGS. 29 and 30, a hose adapter 6500 is shown. Hose adapter 6500 is comprised of a threaded portion 6502 whose threads are dimensioned and configured to mate with threads 44 of adapter ring 20, so that the hose ring can be screwed into adapter ring 20. Threaded portion 6502 terminates at a flange 6504, from which a hose support 6506 extends on the opposite side of the flange from threaded portion 6502. A cylindrical bore 6508 extends through hose adapter 6500 receiving shaft 12. As explained later, hose adapter 6500 is screwed adapter ring 20, so that hose connection 6506 extends towards the hull of the vessel. The end of the hose can be slid onto hose connection 6506 and held in place by a hose connection system.

The insertion of hose adapter 6500 into adapter ring 20 is very simple, as is the connection of the hose to hose connector 6506. Bore 6508 is aligned with other bores through which the vessel shaft extends, so that the hose adapter is easy to install on a vessel with the assembled shaft.

Figure 31:
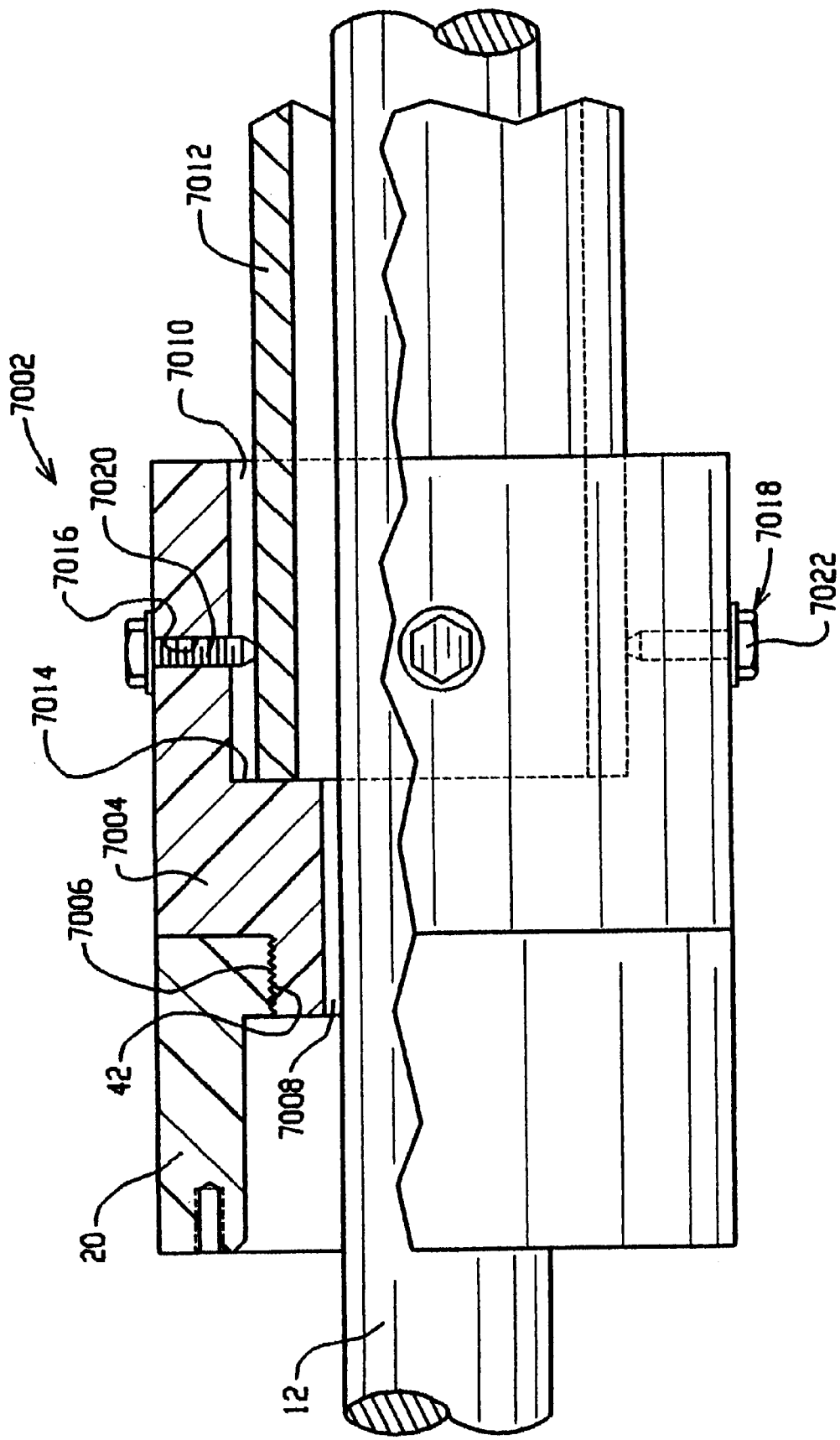
FIG. 31 is a partial, side, partially cut-away view of a stern tube clamp adapter connected to a stern tube through which a propeller shaft extends, according to an eighth embodiment of the invention.

A stern tube adapter 7002 is depicted in FIG. 31. Tube adapter 7002 includes a tube ring 7004 having an externally threaded portion 7006 with threads being adapted for mating with internal threads 44 of adapter ring 20. A shaft-receiving bore 7008 extends through the engine-facing side of tube adapter 7002 for receiving shaft 12 for rotation. The hull-facing side of tube adapter 7002 has a wider bore having an inner diameter which is lager than the outer diameter of a fiberglass stern tube 7012 which extends from bore 7010 through the hull of the vessel. A shoulder 7014 is provided at the interior end of bore 7010 for abutment with stern tube 7012. Four screw bores 7016 are equilaterally provided through adapter 7002 into bore 7010 for receiving centering screws 7018. Screws 7018 have threaded shanks for enabling screws 7018 to be threaded into bores 7016, and a hexagonal head 7020 for inserting and removing screw 7018 from bore 7016. Screws 7018 are inserted into bore 7016 for engaging stern tube 7012 to locate the stern tube concentrically about shaft 12.

It can be seen that the installation of stern tube adapter 7002 onto adapter ring 20 is a simple procedure, and that stern tube 7012 can easily be installed to adapter 7002.

Figure 32:
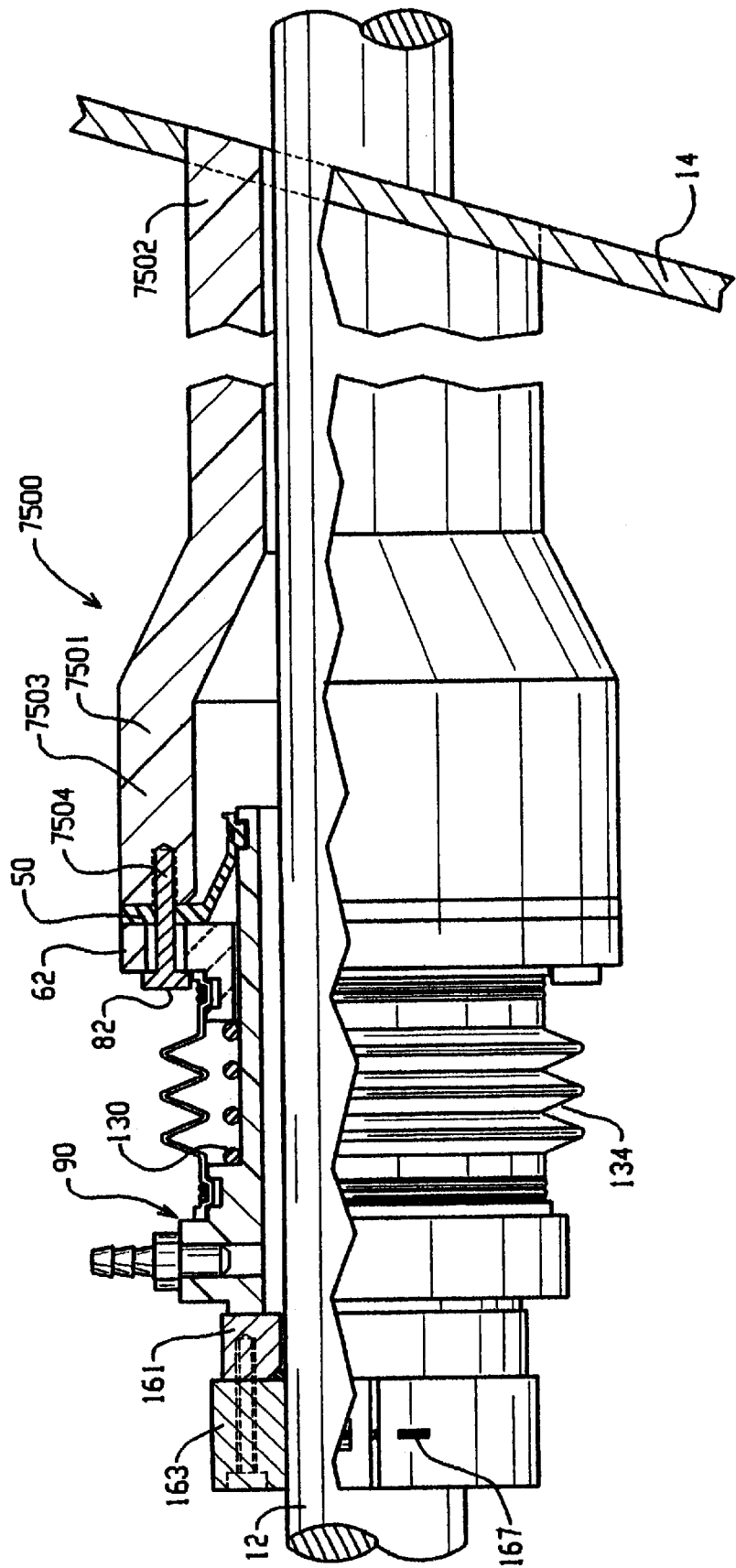
FIG. 32 is a partial, side, partially cut-away view of a stern tribe seal assembly according to a ninth embodiment of the invention.

FIG. 32 shows as another embodiment of the invention a stern tube seal assembly 7500. This embodiment provides a stern tube seal assembly having a stern tube 7502 which is operatively connected to the shaft seal system. In the assembly shown in FIG. 32, many of the members are identical to members discussed in earlier embodiments of the invention, and are given their previous numbers, with reference being given to those earlier parts of the application in which those members are discussed in further detail.

Stern tube 7501 is a custom component, having a section 7502 near hull 14, and a component 7503 dimensioned for attachment to adapter ring 20. Stern tube 7501 is fiberglass, and it is secured by fiberglassing or an appropriate cement to the hull. Tube 7501 is in effect an integral part of hull 14. Parts of the assembly in FIG. 32 are the same as those discussed earlier, and have been designated with the same numerical identifiers. There are sea gasket or diaphragm 50, slide ring 62, centering screws 82 which extend through bores in slide ring 62 and into appropriately aligned bores 7504 in the internal end portion of stern tube 7502 to center the assembly about cylinder 12, friction ring 90, spring 130, spring cover 134, seal ring 161 and shaft clamp 163. As explained earlier, there is a redundant seal against water leaking from the confines of the shaft seal system into the boat by virtue of diaphragm 50 and spring cover 134, even if there is longitudinal or transverse movement of shaft 12. The assembly is entirely rigid from the hull through the stern tube and the shaft seal system. The stern tube assembly and the shaft seal system can be installed from the engine side of the shaft by sliding the shaft seal system 10 on the shaft towards stern tube 7501, inserting centering screws 102, then inserting seal ring 161 arid sliding shaft clamp 163 in place, connecting shaft clamp 163 to seal ring 161 with screws 165, and tightening clamp screws 167 to secure shaft clamp 163 to shaft 12.

Figure 33:
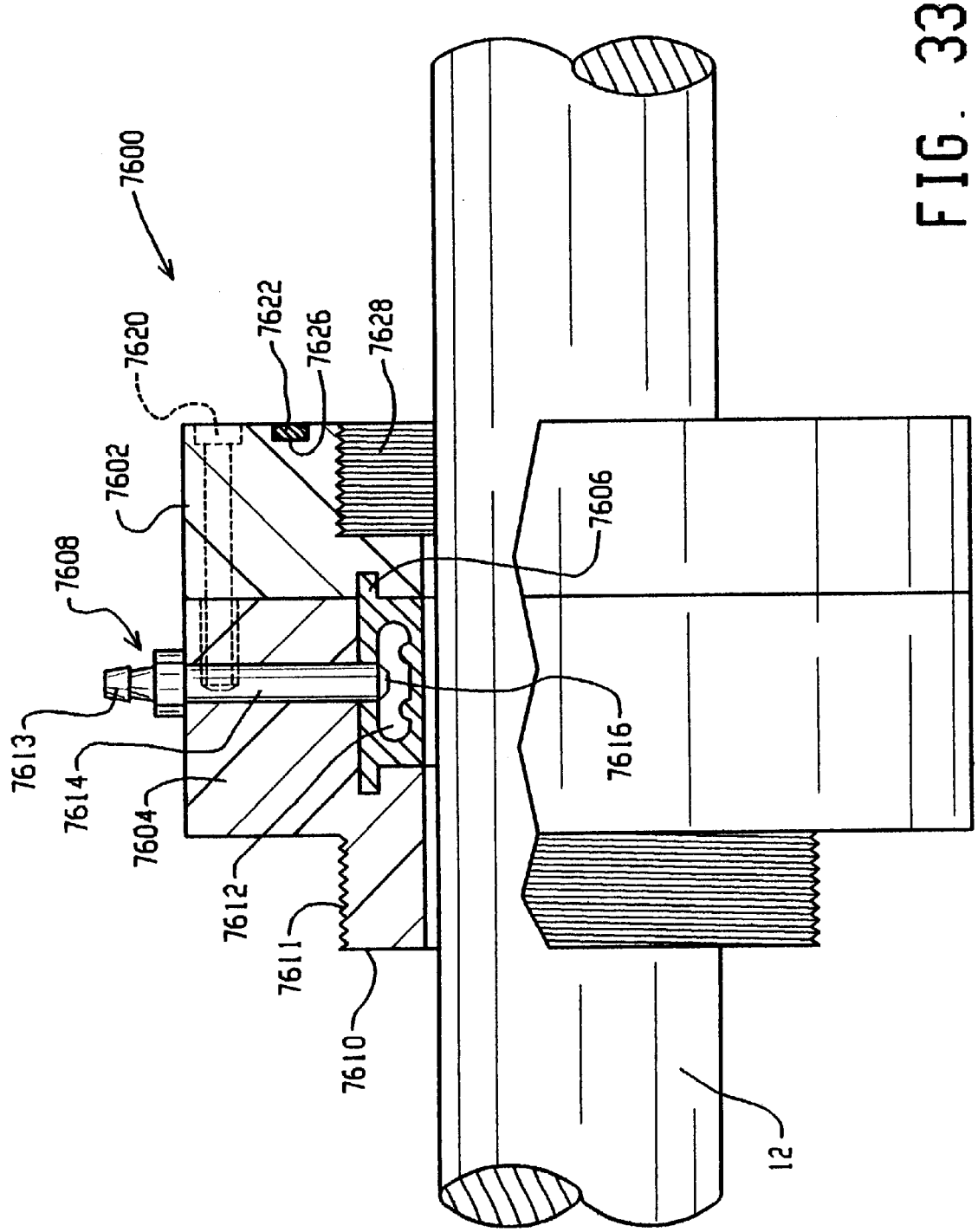
FIG. 33 is a partial, side, partially cut-away view of an air seal assembly according to the invention.
Figure 34:
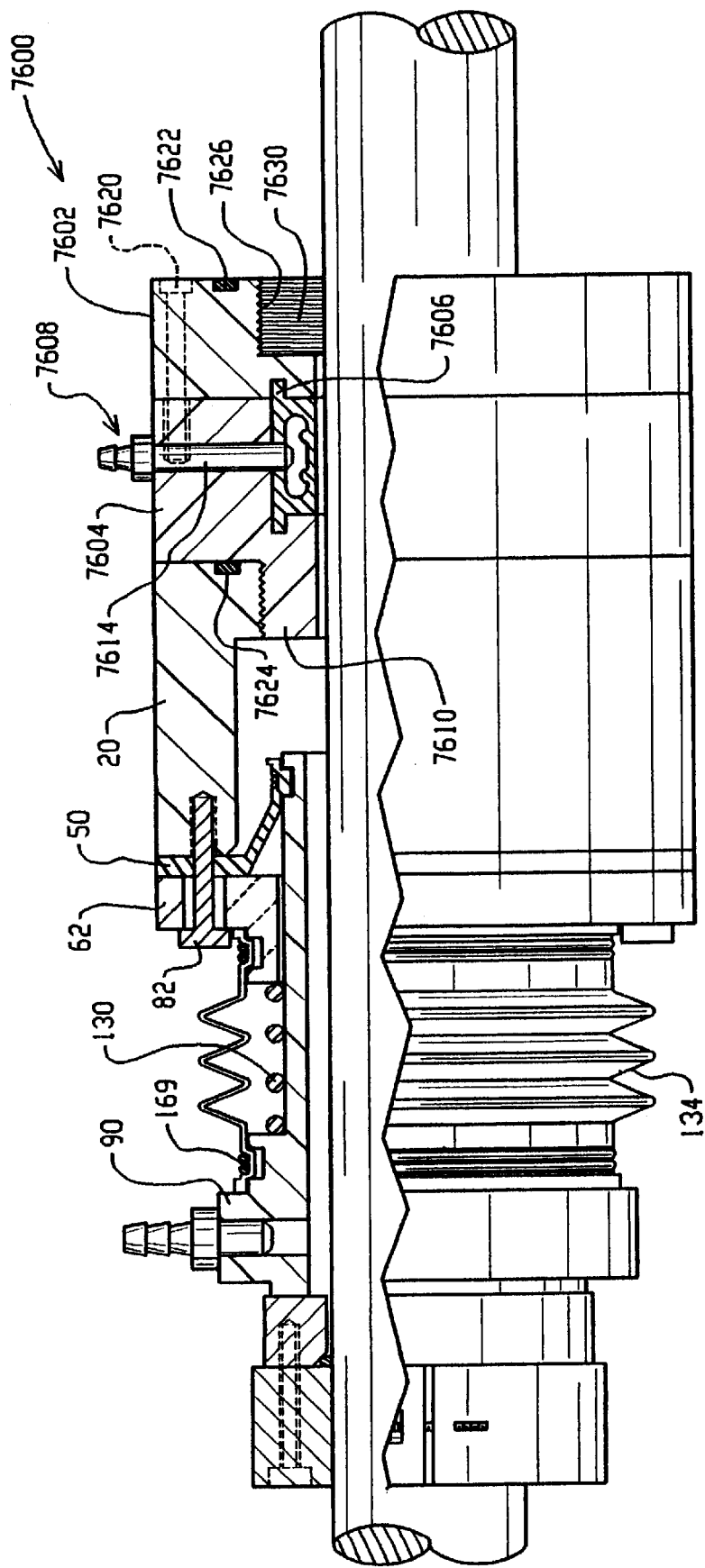
FIG. 34 is a partial, side, partially cut-away view of a tenth embodiment of the invention incorporating an air seal shown in FIG. 33.

An air seal assembly 7600 according to another version of the invention is shown in FIG. 33 and the incorporation of assembly 7600 with shaft seal system 10 is shown in FIG. 34. The air seal assembly is an emergency device, and is activated to engage shaft 12 which should not be rotating. As explained earlier, system 10 includes adapter ring 20, gasket 50, slide ring 62, centering screws 82, friction ring 90, spring 130, spring cover 134, O-rings 169, seal ring 161 and shaft clamp 163. The earlier descriptions can be referred to for a discussion of these and related components. Air seal assembly 7600 is composed of an air seal adapter (female thread) 7602), an air seal adapter (male thread) 7604, an air seal 7606 and an air valve assembly 7608. The male air seal adapter has an extending portion 7610 with external threads 7611 adapted and configured to be screwed into the receiving threads 42 of adapter ring 20. Air seal 7606 is a plastomeric annular component having an internal chamber 7612 which can be filled with air under pressure flowing through nozzle 7613 and a bored stem 7614 of air valve 7608. The pressurized air enters chamber 7612 through an appropriately dimensioned and configured inlet port 7616, to expand and engage shaft 12, to prevent or reduce the flow of water along the shaft. A radial bore 7618 through air seal adapter 7604 is dimensioned to receive stem 7614 without allowing air or water to flow between bore 7618 and stem 7614. A set of longitudinally extending connection screws 7620 connect air seal adapters 7602 and 7604, through aligned, receiving bores in adapters 7602 and 7604. An O-ring 7622 is located in recesses 7624 of adapter ring 20 and 7626 in air adapter 7602 to further enhance the seal between air seal adapter 7604 and adapter ring 20, and air seal adapter 7602 and its adjacent part. A longitudinal bore extends through air seal adapters 7602 and 7604 to receive shaft 12 for rotation. Internally threaded receiving bore 7628 is provided for receiving a thru-hull adapter ring or other adapters mentioned previously for connection of the air seal adapter to the hole in the hull. The air seal adapters are made from strong, non-corrosive materials such as delrin. The air seals are available in the marketplace from Duramax, Inc., and at least one is made from nitrile.

Figure 35:
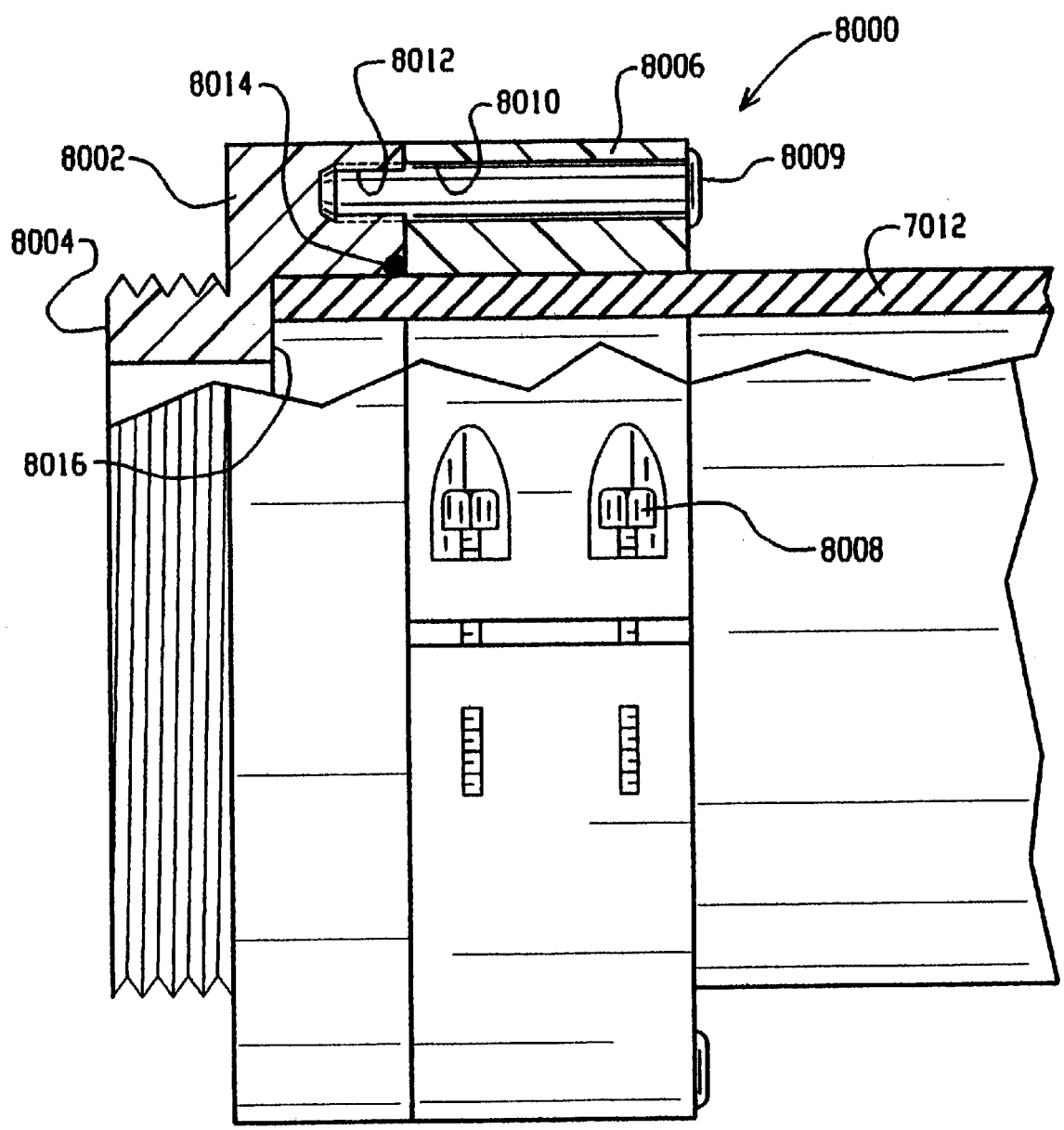
FIG. 35 is a partial, side, partially cut-away stern tube clamp seal assembly according to the invention.

A stern tube clamp assembly 8000 is shown in FIG. 35 for use with a stern tube 7012 as shown in FIG. 31. Stern tube clamp assembly 8000 is another attachment which can be used with shaft seal adapter 10. An adapter clamp 8002 has an extending, externally threaded portion 8004 to be screwed into adapter ring 20. A stern tube clamp 8006 is clamped around stern tube 7012 and held in place by clamp screws 8008. Stern tube clamp 8006 and adapter clamp 8002 are connected together by a set of connecting screws 8009 which extend through aligned bores 8010 and 8012 of shaft clamp 8006 and adapter clamp 8002. Stern tube 7012 is integrally connected with the hull of the vessel as explained previously. Shaft receiving bores extend through adapter clamp 8002 and shaft clamp 8006. An O-ring 8014 is disposed at the intersection of adapter clamp 8002, stern tube clamp 8006 and the exterior of stern tube 7012 to add another seal to the assembly. In order to assembly the stern tube seal assembly, stern tube clamp 8006 is slid onto stern tube 7012, O-ring 8014 is placed at the inner edge of stern tube clamp 8006, and adapter clamp 8002 is then slid on until its internal shoulder 8016 abuts the end of stern tube 7012. The clamps are attached by connecting screws 8008, and the stern tube clamp assembly is then screwed to adapter ring 20. Adapter clamp 8002 and stern tube clamp 8006 are made from delrin or some other strong, corrosion-resistant material.

Figure 36:
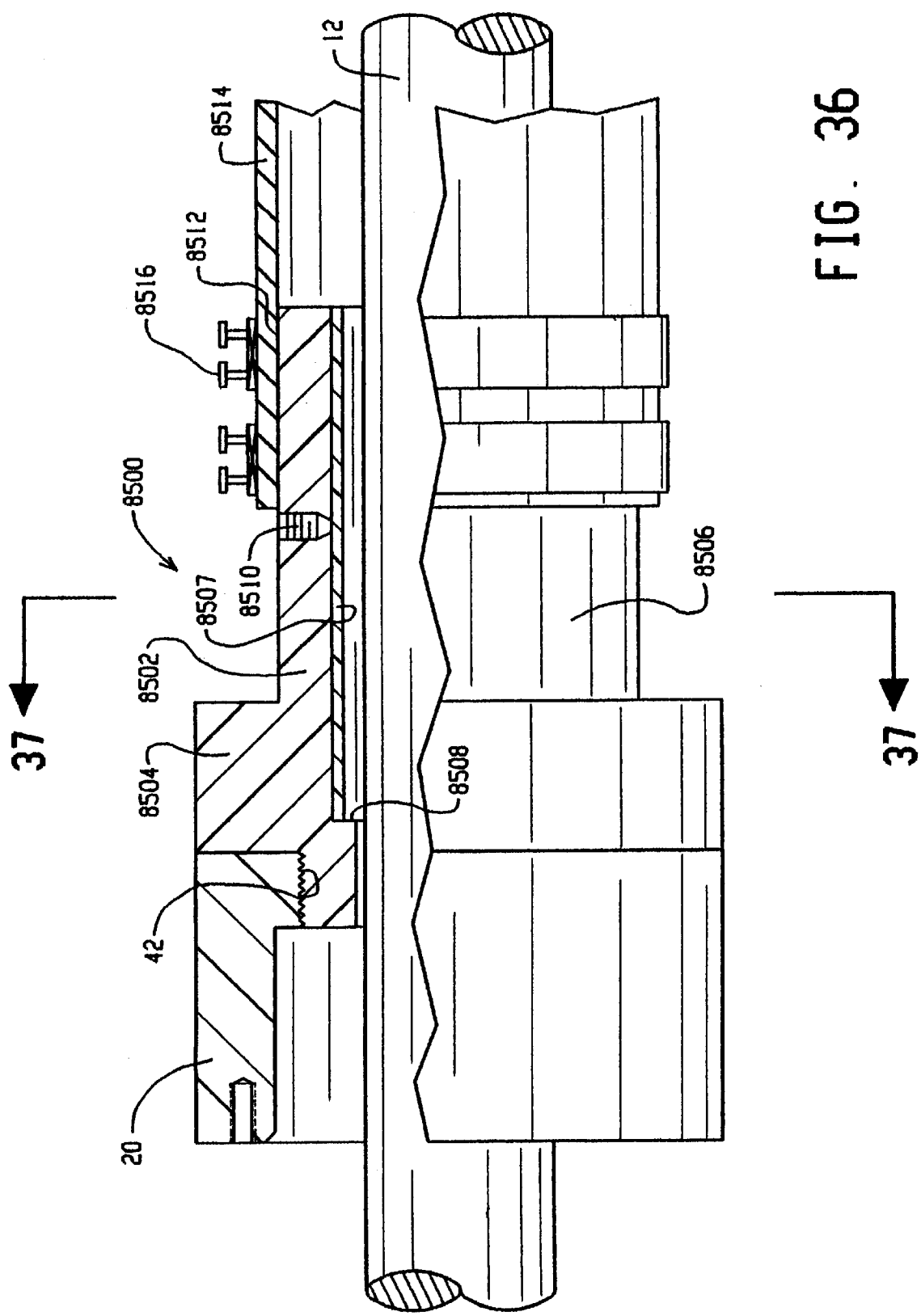
FIG. 36 is a partial, side, partially cut-away hose bearing adapter according to the invention.
Figure 37:
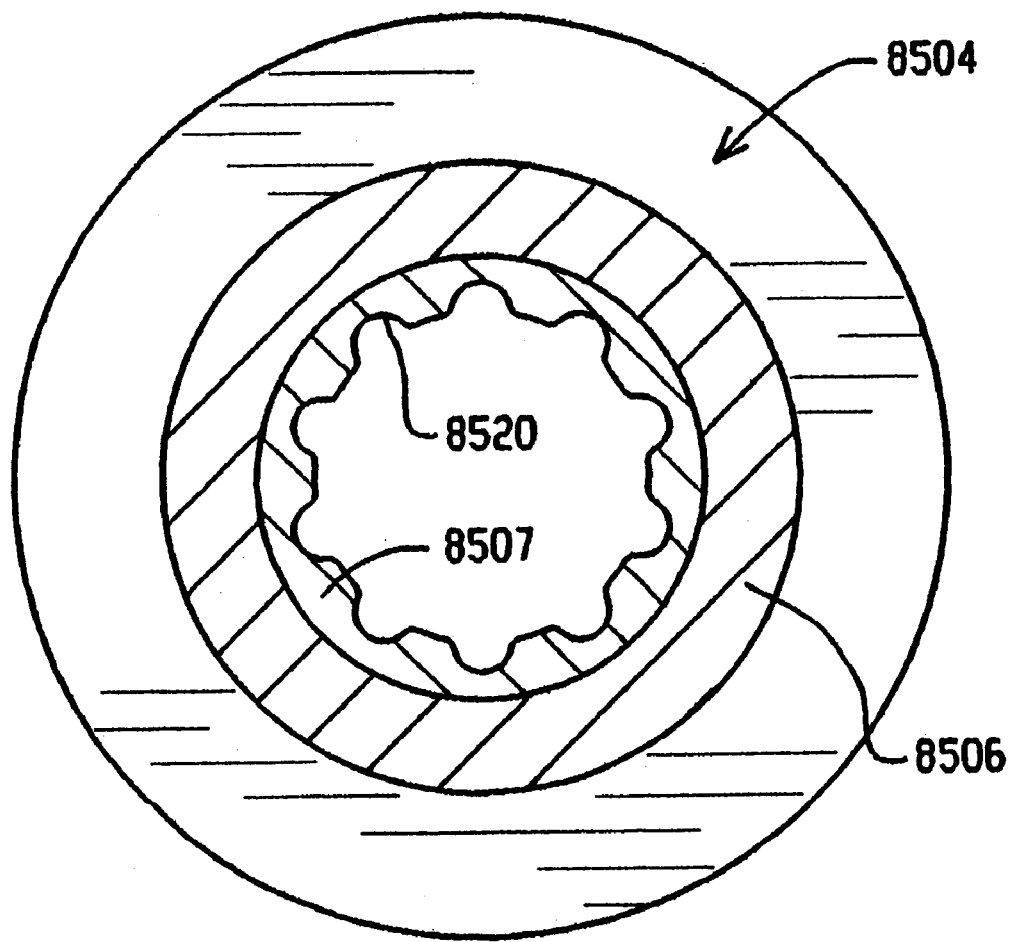
FIG. 37 is an end view of the hose bearing adapter shown in FIG. 36.

A hose bearing adapter assembly 8500 is illustrated in FIGS. 36 and 37. Assembly 8500 is yet another attachment possible with shaft seal adapter 10. It includes a hose adapter 8502 having an externally threaded extension 8504 to be attached to adapter ring 20 by being screwed into internal threads of section 42 of ring 20. The hose adapter 8502 has a relatively long extension 8506 for receiving along an internal bore, a bearing 8507 which can he made from a rubber-like material, and which abuts at shoulder 8508. A radially threaded bore 8510 is provided for receiving a set screw to hold the bearing 8507 in place. An outside cylindrical surface 8512 receives a hose 9514 with extends beyond extension 8506 towards and onto a stern tube which is integral to the hull of the vessel at the hole through which the shaft extends. Hose 8514 is held on hose adapter ring 8502 by hose clamps 8516. A longitudinal shaft-receiving bore 8518 extends through hose adapter ring 8504. The cross-sectional view shown in FIG. 37 includes the wide part of hose adapter ring 8504, the extension 8506 and bearing 8507 having longitudinally extending, generally semi-circular recesses 8520. Hose adapter ring 8502 should be made of a strong, corrosion-resistant material such as delrin.

Assembly of hose bearing adapter assembly 8502 is easy. Bearing 8507 is inserted into the bore of extension 8506 until it abuts shoulder 8508. The end of hose 8514 is then slid on surface 8512 and clamped in place by hose clamps 8516. A set screw is screwed into bore 8510. The assembly 8500 is then connected to adapter ring 20.

The invention according to its preferred embodiment provides an effective and efficient device for preventing water leakage along the propeller shaft into a vessel. The shaft seal system is rigid to prevent damage and leakage from impacts to the system, it can be easily installed without removing a vessel from the water, and it is corrosion and wear-resistant. Many attachments can be used with the shaft seal system for use with many types of vessels, and these attachments are easy to install, and effective and efficient in use.

The invention has been described in its preferred forms, bit variations and modifications within the spirit and scope of the invention may occur to those skilled in the art from the preceding description and in the appended claims.

What is claimed is:

1. A hose adapter in combination with a shaft seal system for sealing against water leakage along the propeller shaft of a vessel extending from an opening in the hull of the vessel to an adapter ring of said shaft seal system, the adapter ring having a shaft-receiving bore and a component attachment means comprising screw threads for attachment of the adapter ring to other components of said system, the adapter ring having a fore end portion operatively connectable to an inboard fluid seal system and an aft end portion connectable to at least one component extending from an opening in the hull of the vessel, said adapter comprising:

shaft-receiving fore means having a bore for receiving the propeller shaft and for alignment with the shaft-receiving bore of the adapter ring;

adapter ring attachment means for attaching said adapter to the aft end portion of the adapter ring to align said shaft-receiving bore means of said adapter with the shaft-receiving bore of the adapter ring, said adapter ring attachment means comprises a threaded portion operatively engagable with the screw threads of the adapter ring;

coupling means for coupling a shaft-receiving tubular means extending from the hull to said adapter, said coupling means comprising a cylindrical extension for receiving a hose extending towards the hull for coupling the propeller shaft and preventing water leakage; and said adapter being rigid to reduce any damage caused by any impact transverse to said adapter.

2. A sealing device for sealing against water leakage from a propeller shaft and a vessel wall into which the shaft passes, said device comprising:

stern tube means connectable to the wall and having a bore for receiving the shaft for rotation;

generally rigid slide ring means stationary with respect to the shaft and having a bore for receiving the shaft for rotation, said slide ring means operatively attachable to said stern tube means;

generally rigid friction ring means having a bore for receiving the shaft for rotation, and a friction ring seal surface for engagement with a sealing surface rotatable with the shaft for establishing a watertight seal, said friction ring means being attached to said slide ring means in a moveable relationship, said friction ring means being independent of said slide ring means and being movable relative to said slide ring means;

biasing means for urging said friction ring seal surface into engagement with the sealing surface rotatable with the shaft; and diaphragm means connected to said slide ring means and to said friction ring means for preventing water from flowing to said biasing means.

3. A fluid sealing device for a propeller drive shaft extending through an opening in the hull of a vessel, the shaft having a generally linear axis and having seal ring means with a seal ring seal surface, the seal ring means being mounted to the shaft for rotation with the shaft, said device having a shaft-receiving passageway and comprising:

adapter ring means having an aft end for connection to different types of adapters extending through the opening in the hull;

friction ring means having a friction ring seal surface for engaging the seal surface to create a watertight seal;

biasing means for exerting a biasing force on said friction ring means to provide for the engagement of said friction ring seal surface and the seal ring seal surface;

resilient means for preventing the flow of water along the shaft, said resilient means extending or retracting with the fore and aft movement of the shaft and said friction ring means;

slide ring means attached to said resilient means for preventing the movement of said resilient means along the axis of the shaft, said slide ring means being independent of said friction ring means and movable relative to said friction ring means; and support means for supporting said biasing means between said slide ring means and said friction ring means;

said friction ring means being movable relative to said slide ring means and to said support means, in response to movement of the shaft, while said friction ring means is biased by said biasing means to maintain the engagement of said friction ring seal surface and the seal ring seal surface.

4. A fluid sealing device according to claim 3, wherein said biasing means comprise a plurality of springs, and said support means comprise a plurality of supports for each of said springs.

5. A fluid sealing device according to claim 4, wherein said supports are fixed to said slide ring means, and wherein said device further comprises means for retaining said biasing means on the respective support means to enable said biasing means to continuously keep the biasing force on said friction ring means.

6. A fluid sealing device according to claim 5, wherein said supports are posts fixed in said slide ring means and extending through a portion of said friction ring means, and wherein said springs are wound about said supports.

7. A fluid sealing device according to claim 3, wherein said resilient means comprises a diaphragm.

* * * * *